United States Patent
Dickson

(10) Patent No.: US 10,248,345 B1
(45) Date of Patent: Apr. 2, 2019

(54) PERSISTING DATA AS INFORMATION

(71) Applicant: Veritas Technologies LLC, Mountain View, CA (US)

(72) Inventor: Christopher M. Dickson, Roseville, MN (US)

(73) Assignee: Veritas Technologies LLC, Mountain View, CA (US)

( * ) Notice: Subject to any disclaimer, the term of this patent is extended or adjusted under 35 U.S.C. 154(b) by 47 days.

(21) Appl. No.: 15/054,728

(22) Filed: Feb. 26, 2016

(51) Int. Cl.
  G06F 3/06 (2006.01)
  H04L 29/06 (2006.01)
  H04L 29/08 (2006.01)

(52) U.S. Cl.
  CPC .......... G06F 3/0631 (2013.01); G06F 3/0604 (2013.01); G06F 3/0656 (2013.01); G06F 3/0661 (2013.01); G06F 3/0688 (2013.01); H04L 65/607 (2013.01); H04L 67/2804 (2013.01)

(58) Field of Classification Search
  CPC .. G06F 11/0727; G06F 11/073; G06F 3/0631; G06F 3/0604; G06F 11/0706; G06F 11/0709; G06F 11/0712; G06F 3/0656; G06F 3/0661; G06F 3/0688
  See application file for complete search history.

(56) References Cited

U.S. PATENT DOCUMENTS

| | | | |
|---|---|---|---|
| 7,103,824 B2 | 9/2006 | Halford | 714/759 |
| 9,448,730 B2* | 9/2016 | Grube | G06F 11/10 |
| 2013/0332694 A1* | 12/2013 | Reissner | G06F 3/0644 711/172 |
| 2015/0149789 A1* | 5/2015 | Seo | G06F 3/0608 713/193 |
| 2016/0224249 A1* | 8/2016 | Desai | G06F 3/065 |
| 2016/0291898 A1* | 10/2016 | Beitler | G06F 3/0643 |

OTHER PUBLICATIONS

Offermann, T. 2013, "Tiny Docker Pieces, Loosely Joined" http://offermann.us/2013/12/tiny-docker-pieces-loosely-joined.html.*
C. Evans, "Storage & Virtual Containers: Where Does the Data Go?" 2015, https://www.networkcomputing.com/storage/storage-virtual-containers-where-does-data-go/1482851685.*
C. Evans, "Docker storage 101: How storage works in Docker," 2015, http://www.computerweekly.com/feature/Docker-storage-101-How-storage-works-in-Docker.*
C. Pahl, "Containerization and the PaaS Cloud," IEEE Cloud Computing, 2015.*

* cited by examiner

*Primary Examiner* — Tracy A Warren
(74) *Attorney, Agent, or Firm* — Campbell Stephenson LLP

(57) ABSTRACT

Disclosed herein are methods, systems, and processes to persist data as information. A logical container is created. The logical container is dynamically defined to correspond to a storage device. Original data or encoded data written by an application container is received. If original data is received, encoded data is generated from original data. If encoded data is received, original data is generated from encoded data. Generating encoded data from original data, and original data from encoded data involves calculating original metadata for original data, and encoded metadata for encoded data. Encoded data or original data along with original metadata and encoded metadata is transported through the logical container past a persistence boundary. In response to transporting past the persistence boundary, a confirmation is received original data has been persisted.

22 Claims, 14 Drawing Sheets

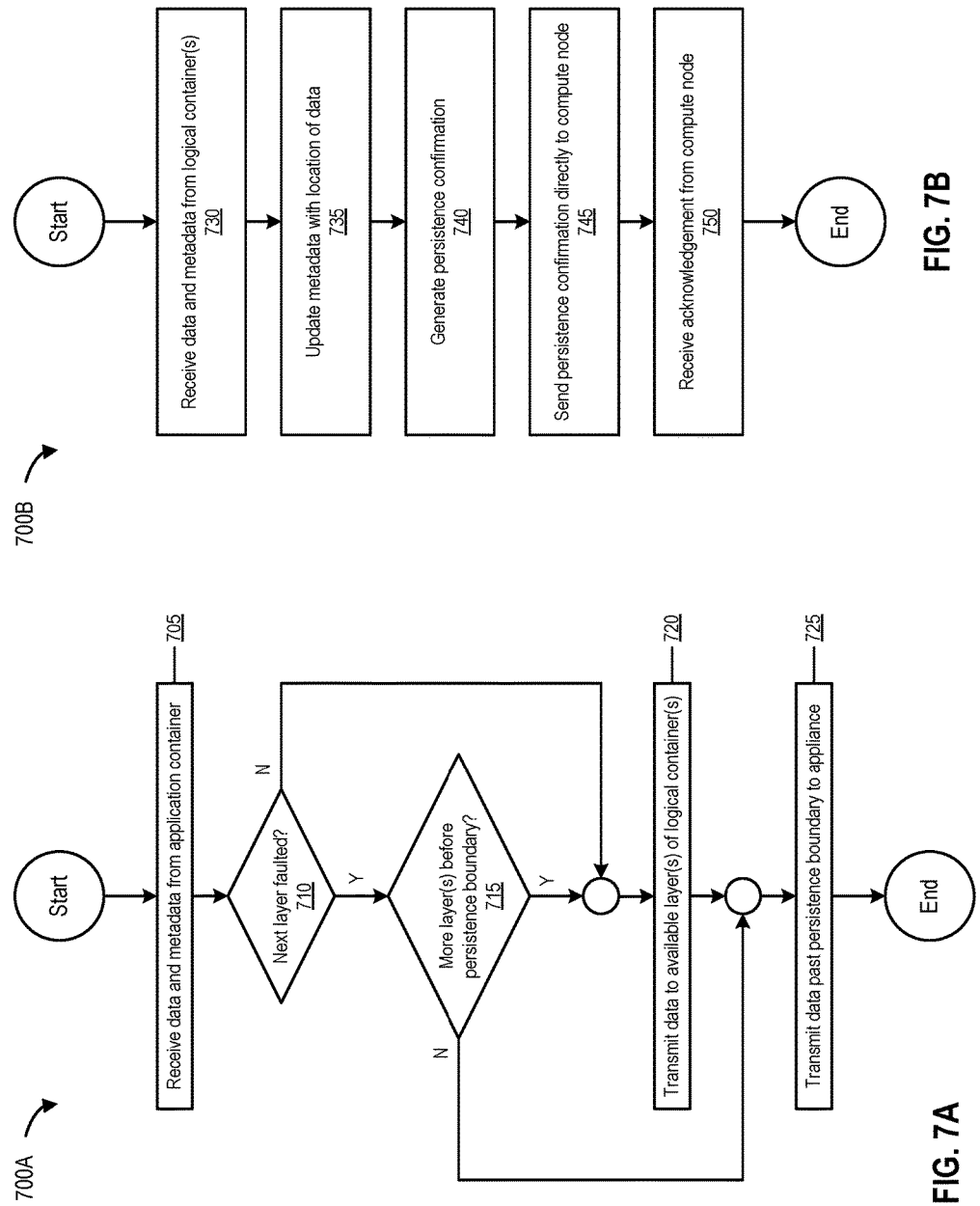

PERSISTING DATA AS INFORMATION

FIELD OF THE DISCLOSURE

The present disclosure relates to data persistence systems, and more particularly, to persisting data as information in container-based application environments.

DESCRIPTION OF THE RELATED ART

Persistence is the continuance of an effect after the cause of the effect is removed. In the context of data storage, persistence means that data remains accessible after the process with which the data is created is terminated. Currently, for data to be considered persistent, the data must be written to a non-volatile storage device. Non-volatile storage devices use storage containers upon which data is persisted as stored values. Therefore, data is persistent if the data is a stored value in a specific location on a non-volatile storage device.

Containers provide application reliability when an application is moved from one computing environment/system to another. A container includes a runtime environment: an application plus dependencies, libraries, binaries, and configuration files required to run the application. By containerizing the application platform and the application's dependencies, differences in operating system (OS) distributions and underlying hardware and software infrastructure between disparate computing environments/systems are abstracted away.

Given their advantages, application containers are gaining rapid acceptance in the information technology (IT) industry as a superior vehicle for provisioning applications. From the perspective of an application container, data is information. However, from the perspective of a storage container, data is a stored value (e.g., in a specific and identifiable location on a non-volatile storage device). Therefore, it can be advantageous to avoid the currently-existing dependence of application environments on traditional storage containers to provide and guarantee data persistence. It would be preferable to persist data as information in such container-based application environments.

SUMMARY OF THE DISCLOSURE

Disclosed herein are methods, systems, and processes to persist data as information in container-based application environments. One such method involves creating a logical container. The logical container is dynamically defined to correspond to a storage device. Original data or encoded data written by an application container is received. If original data is received, the method generates the encoded data from the original data. If encoded data is received, the method generates the original data from the encoded data.

In some embodiments, generating encoded data from original data, and original data from encoded data also involves calculating original metadata for original data, and encoded metadata for encoded data. The method transports encoded data or original data along with original metadata and encoded metadata through the logical container past a persistence boundary. In response to transporting past the persistence boundary, the method receives a confirmation that original data has been persisted.

In other embodiments, the confirmation is generated after original metadata and encoded metadata has been updated past the persistence boundary. In this example, the updating is performed by an information container, and the confirmation is generated by the information container. In some embodiments, the original data is generated by an application instance. The application instance executes within the application container, and the logical container is created on a non-volatile storage device.

In certain embodiments, the method causes original data to be copied to a transport buffer. The transport buffer is associated with the application instance. In these examples, original data is part of an original stream, an encoded stream is generated by encoding original data, and creating the encoded stream further involves calculating original metadata and encoded metadata.

In one embodiment, the method accesses the encoded stream in the transport buffer. The method then decodes the encoded stream by splitting the encoded stream into at least two original sub-streams. The method then writes a first original sub-stream to a first logical container, and a second original sub-stream to a second logical container.

In some embodiments, transporting encoded data or original data involves transporting the encoded stream and decoding the encoded stream, or transporting the original stream and encoding the original stream. In this example, the encoding and the decoding is performed using a symmetric encoding technique. The symmetric encoding technique permits determination of an error-correcting code (ECC) from original data or encoded data, or identifies original data or encoded data from the ECC. In some examples, the method maintains original data or encoded data in the logical container until the application container receives confirmation that original data has been persisted.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the appended claims, will become apparent in the non-limiting detailed description set forth below.

BRIEF DESCRIPTION OF THE DRAWINGS

The methods, systems, and processes in the present disclosure may be better understood, and their numerous objects, features, and advantages made apparent to those skilled in the art, by referencing the accompanying drawings.

FIG. 7A is a flowchart that illustrates a process for transporting data through logical containers, according to one embodiment of the present disclosure.

FIG. 7B is a flowchart that illustrates a process for receiving a persistence confirmation acknowledgement from a compute node, according to one embodiment of the present disclosure.

Figure 1A:
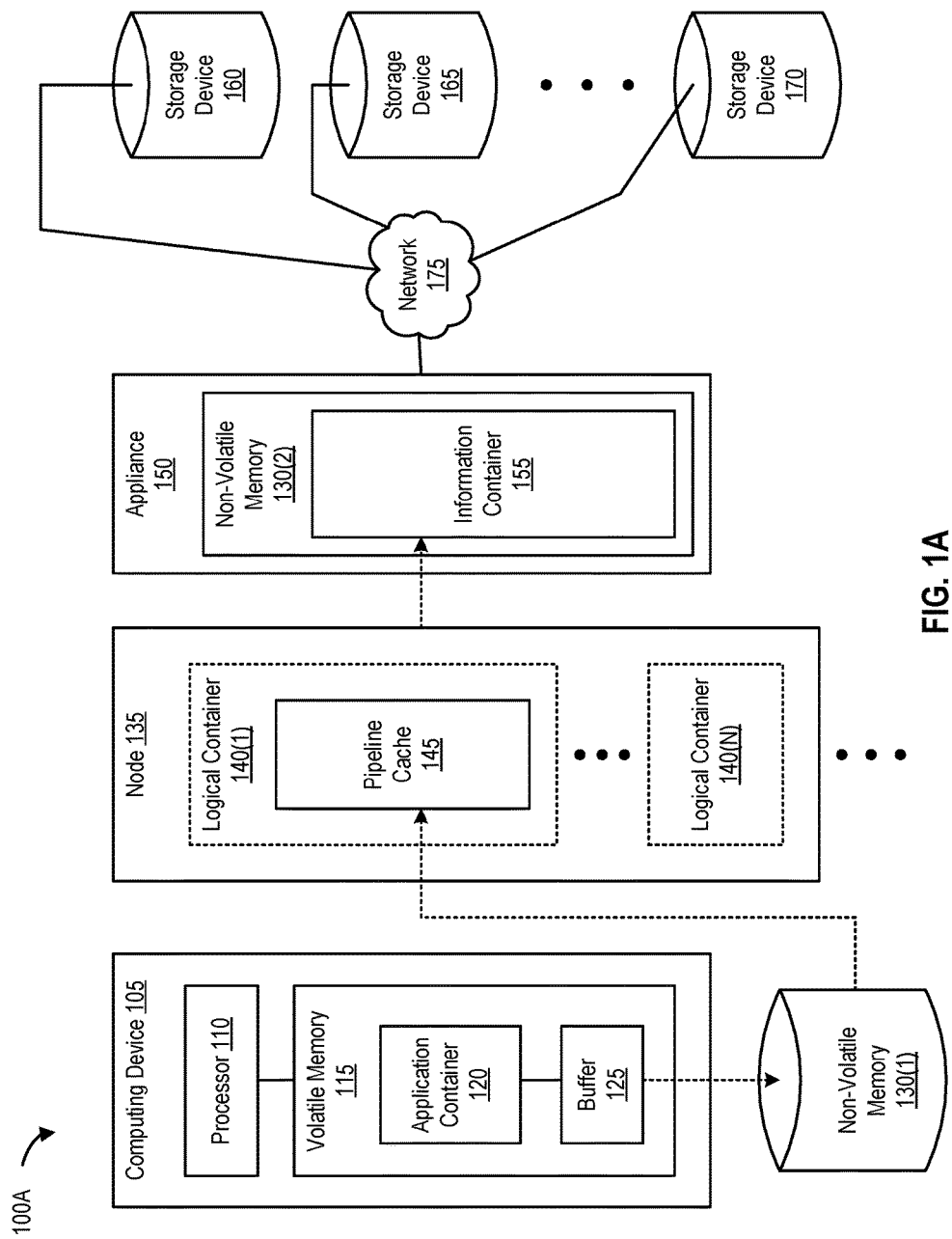
FIG. 1A is a block diagram of an information persistence system, according to one embodiment of the present disclosure.

While the disclosure is susceptible to various modifications and forms, specific embodiments herein are provided as examples in the drawings and detailed description. It should be understood that the drawings and detailed description are not intended to limit the disclosure to the particular form disclosed. The intention is to cover all modifications, equivalents and alternatives falling within the spirit and scope of the disclosure as defined by the claims.

DETAILED DESCRIPTION

Introduction

High-level and fault-tolerant data storage systems require physical storage devices (e.g., mechanical disks) in order to reliably persist data (e.g., writing data to non-volatile memory as a stored value). Such data storage systems have historically been predicated on the concept of a storage container, with the goal of assuring that the contents of the storage container will remain intact, even in the face of hardware failure. Therefore, in existing data storage systems, the data itself is not protected directly. Rather, the storage container into which the data is written is the protected entity.

Several such "storage" protection schemes currently exist. In systems that use Redundant Array of Independent Disks (RAID), storage container protection is accomplished by using block-by-block replication (e.g., RAID-1), or by using block-level Error Correcting Code (ECC) that requires a given number of Hard Disk Drives (HDDs) or Solid State Drives (SSDs) to remain operational in order for the stored data to be preserved (e.g., RAID-6) (or a combination of the two foregoing methodologies).

Certain storage systems (e.g., object storage systems) and databases (e.g., Non-SQL (NOSQL) databases) that use virtual storage containers offer distributed object-level storage protection across commodity storage devices. Typically, the rationale for these systems is that although they require more storage than RAID, they reduce cost and risk, and are easier to scale and manage because of increased device-level redundancy. In such systems, proprietary arrays can be replaced with distributed, directly-attached commodity storage devices to reduce cost.

In storage systems that use and implement virtual containers for replicating data, the additional redundancy provided requires a three-way replication of each stored object within three physical and/or virtual storage containers. However, using multiple virtual containers to store three copies for each virtual container permuted across different subsets of available physical nodes mitigates the operational impact of adding capacity on one hand, and recovery from device failures on the other.

In some storage systems, an erasure coding layer can be implemented across each virtual container (e.g., like the same block-container protection model as RAID, or an object-container equivalent) with the aim of protecting virtual storage containers rather than physical storage containers. In these storage systems, the goal is to reduce storage overhead while retaining the operational and management flexibility afforded by a large number of scattered virtual containers.

Some cloud-based storage services and systems offer a slightly different approach. These cloud storage systems divorce an object-persistence Service Level Agreement (SLA) from the requirement to keep a bounded (or corresponding) subset of a given number of physical storage containers intact (or available). However, for resiliency, such cloud-based services are dependent on providing increased redundancy through per-object replication—first across physically disparate service availability regions (ARs), and then over multiple storage tiers within each AR.

Therefore, cloud-based storage services and systems persist and manage data using an object/service based model because such a model is easily manageable, arbitrarily scalable, and storage-technology agnostic. Further, such cloud-based storage services and systems do not require any single physical storage container to simultaneously provide high performance and high reliability. A cloud storage provider can thus minimize capacity cost by using the cheapest available commodity mass storage medium, while at the same time providing high performance when and where needed (e.g., by using SSDs for data that requires a high access frequency, a high streaming bandwidth, and/or random Input/Output (I/O) operations).

However, the foregoing storage protection schemes, services, and systems suffer from several shortcomings. For example, object storage services experience high latency and employ RESTful (Representational State Transfer) Application Programming Interfaces (APIs) making them unsuitable for direct use by many existing enterprise applications because of application compatibility issues. Some service-oriented storage/persistence systems also have a minimum scale requirement that makes implementation of a geographically distributed highly available storage service highly impractical and cost prohibitive.

Further, such systems and services require a tradeoff between performance and resiliency. Providing low storage latency is only possible for ephemeral storage, which is unprotected. Solutions that are protected from device failure on computing instance termination experience higher latency and lower I/O performance than ephemeral storage. This conundrum forces the application owner/user to choose between high performance and high resiliency.

In addition, the architectural simplicity of per-object replication-based protection comes at the cost of reduced storage efficiency leading to excess storage redundancy as well as excess network bandwidth requirements. Moreover, a replication-based data resiliency solution does not provide, at least by itself, an assurance that the data stored is the same as the data that is retrieved (e.g., unless more than one copy of the data is read upon retrieval). Providing data integrity is thus dependent upon and has devolved into each individual storage device or storage container which both increases storage container cost and further reduces the value derived from replicated copies. For example, even when an object-level checksum, hash, or message digest is stored as metadata, compared on retrieval, and indicates a mismatch (thus prompting retrieval of an alternate copy of the data), there is no guarantee that the original error was not introduced early in the replication process, and then promulgated through the replicated copies, making correction, or even detection, unrealistic and inefficient.

In combination, the foregoing factors currently impose formidable barriers in terms of performance, integrity, cost, and complexity to enterprise-wide adoption of a service-oriented storage model as an alternative to traditional storage. Therefore, it would be advantageous to view "data-as-information" and "data-as-stored values" as different concepts because a practical distinction exists between (a) a set of named and stored data that can be referenced by a running application (e.g., the application's namespace), and (b) the underlying physical or (logical) storage container(s) upon which that data is persisted. In modern IT environments, an application's execution environment can be more simply and efficiently managed and provisioned by using application containers (rather than storage containers that require the maintenance of complex file systems). Therefore, the assumed fundamental dependence of application environments on storage containers is no longer valid, and can be a barrier to efficient data provisioning, protection, and management.

Several factors increase the desirability of provisioning and managing data as "information." First, there is an increasing variability of storage access latency across storage devices. Second, there is an increasing size and performance disparity between cache and backing storage. Third, satisfying references to unshared and/or read-only files through a remotely stored file system is inefficient with respect to performance overhead and overall resource utilization (reflected by the increasingly rapid acceptance of application containers for single-instance provisioning). Fourth, data provisioning, high-availability, disaster recovery, and sharing/load balancing of application instances are all related to the same fundamental problem—namely, the instantiation of a completely defined application environment (e.g., an application container) at an arbitrary physical location. Fifth, some applications and APIs do not use Logical Block Addressing (LBA) file systems or volumes at all, but rather persist data and namespace information (e.g., metadata) entirely in memory (e.g., in cache-line addressable memory as memory-mapped files, uniquely-identified objects, log-based data structures, and the like).

Consequently, the foregoing factors make it increasingly difficult and inefficient, as well as decreasingly useful and practical to require every namespace to storage mapping to be remotely created and resolved on a per-reference basis from remotely-located metadata in a block and/or file system structured container, particularly where such mapping is unique to a single application instance and without regard to whether (1) the data itself is physically shared or deduplicated in the remote storage, (2) an identical data item is already present in local storage, or (3) how many underlying levels must be traversed in order to reach the single physical storage location which the data calls home.

Application Containers in a Persistence Environment

Application containers are unaffected by the above inefficiencies that are the result of using a storage container in an unshared, distributed storage system. For example, unlike file systems, application containers can incorporate self-sufficient, abstracted namespace and data mapping information (e.g., a universal namespace, as opposed to a storage system specific reference). Under many circumstances, a universal namespace can enable data references to be resolved immediately and retrieved from a storage device/service directly.

In a traditional virtual machine environment, resolving and retrieving data references can cause remote file system and storage protocol overhead. The potential advantage of an application container's use of a universal namespace is considerable even for directly attached storage, and grows exponentially as storage and metadata service latency increases with distance (at any given asymptotic bandwidth).

Furthermore, application containers can be potentially drawn, created, and/or spun up from multiple read-only sources, or "layers," overlaid on top of each other with file-level granularity. Again, this capability is in contrast to the architecture of virtual machines and file systems where Network File System (NFS) exports and/or mounts as well as "federated" file system referrals require per-instance, per mount-point administrative intervention to set up, involve per-file reference remote protocol overhead to resolve protection and data mappings, and most importantly, do not allow the file system-directed intermingling of files from different namespace servers within the same directory in a hierarchy.

What's more, unless an application container explicitly mounts externally-managed and writeable shared storage (e.g., via NFS or iSCSI (Small Computer System Interface)), the writeable portion of the application container can be regarded as completely private to that particular instance, thus enabling efficient and closely targeted caching, data sourcing, and off-node persistence schemes. Finally, because application containers are free to use unique, universally definitive (e.g., content-addressable) data mappings, application containers facilitate efficient, content-informed, and globally applicable cache management strategies. By stark contrast, opaque, introspectively addressable storage containers are limited to applying uninformed techniques (e.g., Least Recently Used (LRU)) across the narrow scope of a single application instance.

Therefore, given the foregoing, notionally persisting data created and processed in sub-microsecond latency storage (e.g., Non-Volatile Memory) in a logically addressable storage container (e.g., a Network Attached Storage (NAS) share, a virtual machine disk file (VMDK), a file system, a Logical Unit Number (LUN), and the like) is increasingly inefficient.

Information Containers: Abstraction Between Stored and Referenced Data

Information containers can be used to overcome the perception that one cannot know whether data is safely stored without being able to identify the actual physical storage container, or at the very least, the storage system in which the data resides (or is stored). Traditionally, determining that data is "stored" has required knowledge of "where" the data is stored—e.g., the identity and location of a particular storage device or a statically connected set of storage devices that include a logical storage container.

Under the traditional "data-as-stored values" model, data is a collection of physically encoded values that are stored using an identifying reference (e.g., an address), and that can almost always be retrieved from that address. However, under the "data-as-information" model, data is a conveyance for information that is managed according to the purposes for which the data is used (e.g., by users and applications). Under this new model, data can be managed as "information" over a policy-mandated lifecycle with per-item (e.g., data item) granularity.

In one embodiment, an information container is a logical construct and serves as a point of abstraction between "data-as-information" and "data-as-stored values." In this example, the information container utilizes a federation of services that together determine how best to match an application's I/O requirements to available storage containers and repositories in order to optimize application performance and to guarantee information persistence—without assuming that the underlying storage containers/devices are reliable. Therefore, in stark contrast to a storage container that blindly persists data as stored values, an information container can be used to efficiently persist data as information.

An information container can, in some embodiments, be implemented as part of an Information Persistence Platform (IPP) (e.g., as an interface into the IPP). It should be noted that the IPP is not a storage system nor a storage-based file system because the IPP persists data as information and does not require that storage containers be reliably persistent in order to do so. However, like a storage-backed file system, the IPP can provide data related performance and consistency guarantees to an application. The IPP is now discussed in greater detail.

Information Persistence Platform (IPP)

An IPP can be used to persist application container layers as well as data created and/or modified by an application, and can make this data available to running application containers and to information management processes (or agents) in the form of information containers. The IPP can provide assurance of reliability, availability, high-integrity, and persistence of data-as-information, along with namespace metadata (which is also data-as-information), across an arbitrary, heterogeneous, and continuously evolving collection of unreliable storage devices, containers, and services.

For example, the IPP can, among other things, (1) make information containers available to application containers (e.g., an application persistence SLA), (2) ingest changes in application state and persist those changes in information containers (e.g., an application/information persistence SLA), (3) manage the contents and physical disposition of information containers over time (e.g., information management SLA), and (4) maintain knowledge of and facilitate the connection of application instances to a set of information containers which, together, can resolve the set of possible data references in each application container. It should be noted that the distribution of data across information containers may change over time independent and irrespective of the namespace information within the application containers themselves.

In one embodiment, in order to avoid the need for duplication of effort between the storage and information management levels, responsibility for certain functions (e.g., storage cache management) is transferred to the IPP (e.g., from a storage system). However, because compute, storage, and networking hardware functionality fundamentally operates as data-as-stored values, in some embodiments, the IPP is limited to performing its functions in the context of pre-existing storage and memory-management data flows and processes.

In some embodiments, the IPP enhances utility and performance of providing data persistence and integrity in a container-based application environment. Some requirements (and constraints) for the IPP to efficiently persist data as information are now discussed.

In one embodiment, the IPP protects an application consistent view of application data that has been stored in persistent memory (e.g., non-volatile memory). To perform this task, the IPP requires either checkpoints/application-quiesced snapshots (for live memory state), or the ability to consistently capture changes in applicable-addressable persistent memory (e.g., non-volatile memory). The IPP must be provided with the ability to be able to quiesce an application for a non-volatile memory snapshot capture, and/or must be permitted to access OS or Memory Management Unit (MMU) hooks to safely capture changes page-by-page.

To maximize performance when persisting data as information, the IPP can require the explicit control of the contents of low latency storage containers as well as the explicit control of data movements between low and high latency storage devices. The IPP must not require processing and/or a protocol to interfere with the performance of the application. For example, there cannot exist requirements for (1) additional per-request protocol latency, particularly in the file read path over that of storage, or (2) additional copies or buffers in addition to those needed by storage network transport.

In certain embodiments, the IPP can guarantee data persistence and data integrity without requiring the same of non-volatile memory (or other storage/network infrastructure). In this example, the IPP can use commodity storage devices and services (e.g., a cloud based data storage service). In addition, the IPP can minimize the storage and network cost of buffering and redundantly storing data, while at the same time remaining consistent with SLA requirements for persistence, availability, and the like.

In some embodiments, the IPP honors the ordering and synchronicity of writes from the point of view of one or more connected application containers. In this example, the IPP ensures that (1) synchronous events are committed in the information container, (2) provides end-to-end assurance that data has been transported and stored without corruption and/or errors using commodity storage devices (e.g., cloud based storage services) and storage service SLAs, and (3) provides the same (or better) performance with respect to persistence, integrity, and availability assurances for application container and information container metadata that the IPP provides for user data.

Persisting Data as Information

FIG. 1A is a block diagram of an information persistence system that can implement an IPP, according to one embodiment. As shown in FIG. 1A, the information persistence system includes a computing device 105, at least one node 135, an appliance 150, and several storage devices (e.g., storage devices 160, 165, and 170) communicatively coupled to appliance 150 via network 175. Network 175 can include any type of network or interconnection (e.g., the Internet, a Wide Area Network (WAN), a Storage Area Network (SAN), and the like).

Computing device 105 includes a processor 110 and a volatile memory 115. Volatile memory 115 only maintains (or retains) data as long as computing device 105 is powered. Volatile memory 115 implements application container 120 and buffer 125, and is communicatively coupled to and/or has access to non-volatile memory 130(1). An OS executing on computing device 105 (not shown) can execute multiple user space instances in the OS kernel. In this example, each of these user space instances is an application container. Application container 120 includes a runtime environment: an application plus dependencies, libraries, binaries, and configuration files required to run the application.

Node 135 includes logical containers 140(1)-(N). In this example, and according to one embodiment, logical containers 140(1)-(N) are dynamically defined to correspond to one or more of storage devices 160, 165, and/or 170. As shown in FIG. 1A, logical container 140(1) includes a pipeline cache 145. Because pipeline cache 145 is implemented by logical container 140(1), pipeline cache 145 can be used by application container 120 to transport data through logical container 140(1) (e.g., to appliance 150, or to another node (or layer) that implements one or more logical containers). In some embodiments, logical containers 140(1)-(N) are classes, data structures, or abstract data types (ADT) whose instances are collections of other objects. In this example, logical containers 140(1)-(N) are implemented for the purpose of persisting data objects as information. It should be noted that computing device 105 and node 135 can be any of a variety of different computing devices, including servers, personal computing devices, laptop computers, cellular phones, or the like. Computing device 105 and node 135 can also be virtual machines implemented in a virtualization environment.

Appliance 150 implements a non-volatile memory 130(2). Information container 155 executes in non-volatile memory 130(2). Appliance 150 can be a hardware device or server with integrated software, or a virtual device (e.g., a pre-configured virtual machine image created by installing software appliances on a virtual machine). Appliance 150 can be designed and configured to perform persistence operations. In some embodiments, appliance 150 is not designed to allow end users to change the software (including the underlying operating system). In this manner, appliance 150 is designed to be a secure black box for end users.

Figure 1B:
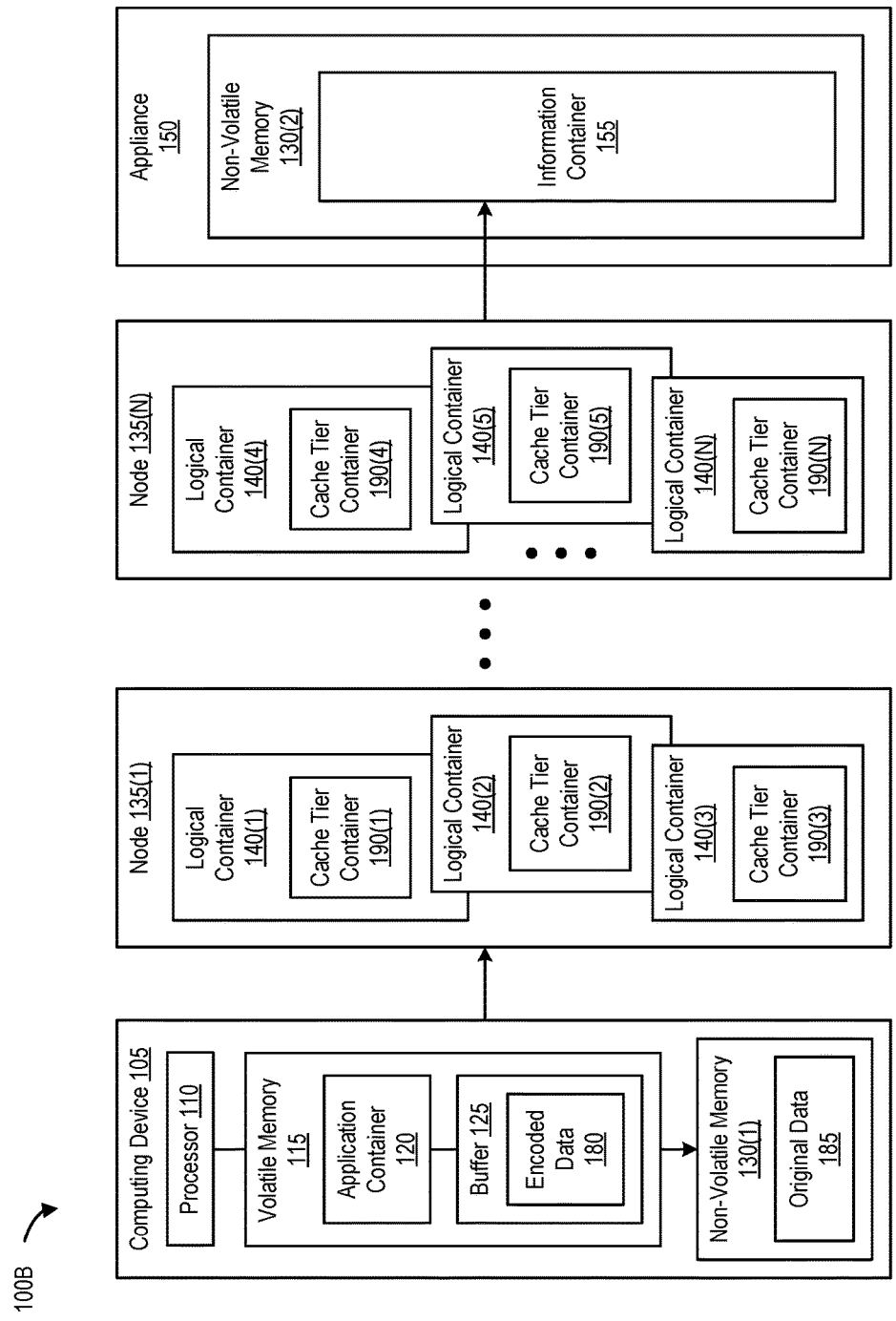
FIG. 1B is a block diagram of a container-based information persistence system, according to one embodiment of the present disclosure.

FIG. 1B is a block diagram of a container-based information persistence system, according to one embodiment. As shown in FIG. 1B, buffer 125 receives data generated by an application instance that executes within application container 120. Each time data is copied into buffer 125 (e.g., original data 185), the data is encoded. At the end of the encoding process, buffer 125 contains an encoded copy of the original data (e.g., encoded data 180). During the process of copying original data into the buffer, a definitive message digest (e.g., MD5, SHA256 hash, and the like), or a block/object-level CRC-32 (Cyclic Redundancy Check) is calculated on the whole of both the input and output streams (e.g., the original data and the encoded data). Therefore, after the first encoding process, there are two copies of data. The original data remains in user memory and the byte-by-byte encoded analog copy of the data is written to buffer 125, accompanied by two checksum and/or hash values—one against the whole of the original data, and the other against the encoded copy that is written to the buffer.

Both copies of data (e.g., encoded data 185 and original data 180) are the same size and contain the same information—but are encoded differently. It should be noted that at this point in the process, the source page/object is still locked from the perspective of the application. The source page/object can be unlocked if a determination is made that there was no hardware failure on the first read (of the source page/object). As long as there is no error in the hardware and/or logic effecting the transfer, the checksum and/or hash values calculated independently reflect the information that was written into buffer 125. Also as shown in FIG. 1B, each node (e.g., nodes 135(1)-(N)) includes one or more logical containers (e.g., logical containers 140(1)-(N)). Each logical container includes a cache tier container that is used to facilitate the transfer of data between each layer of logical containers.

For example, logical containers 140(1)-(3) implemented on and executed by node 135(1) form a first layer, and logical containers 140(4)-(N) implemented on and executed by node 130(N) form a second layer. In one embodiment, each logical container is dynamically defined to correspond to one or more storage devices. Data that is passed through the layers of logical containers is transmitted to information container 155 that executes on non-volatile memory 130(2) on appliance 150.

Encoding/Decoding Data for Error Correction and Data Protection

Figure 1C:
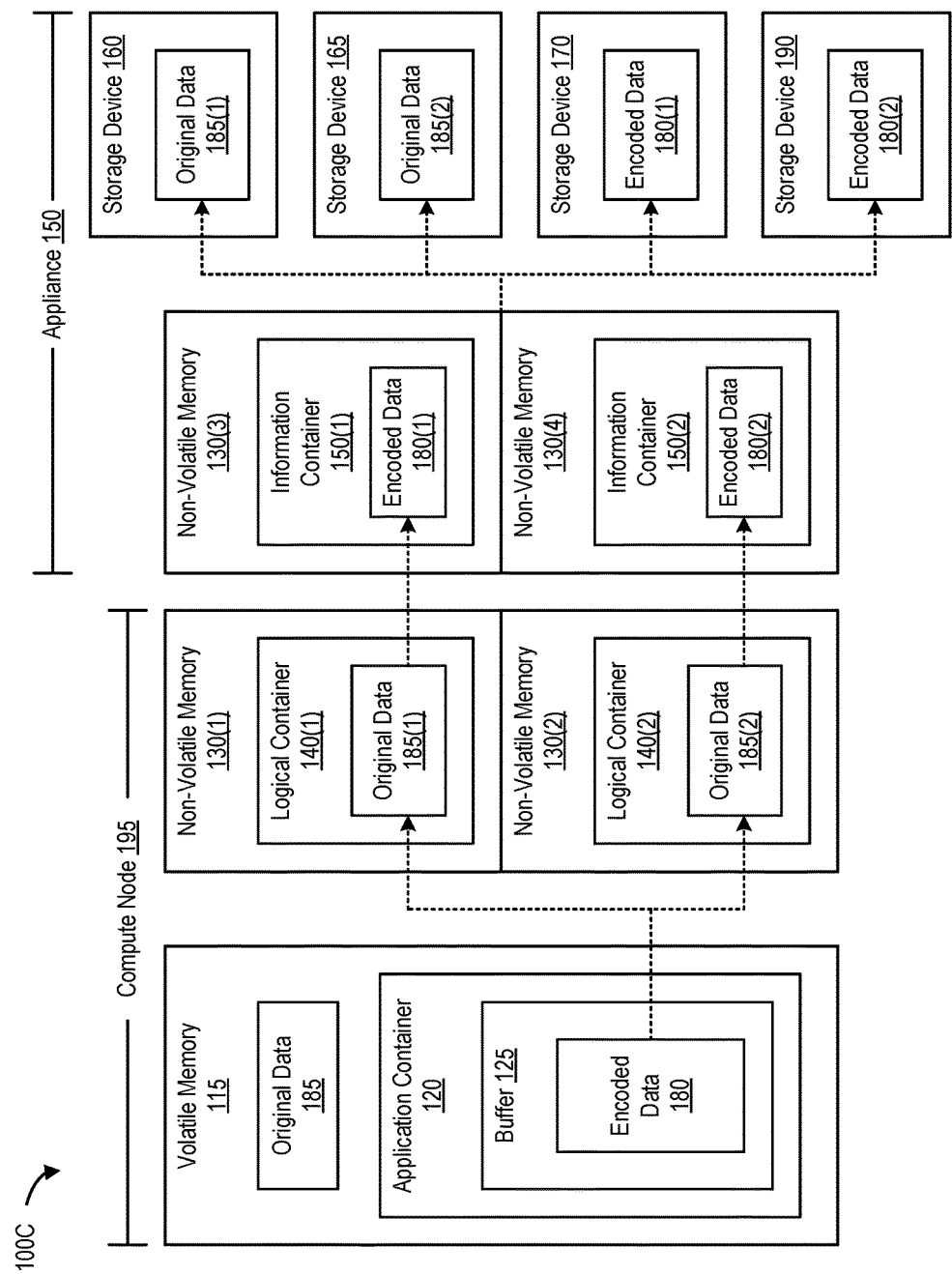
FIG. 1C is a block diagram of a computing system that provides information persistence, according to one embodiment of the present disclosure.

FIG. 1C is a block diagram of a computing system that provides information persistence, according to one embodiment. As shown in FIG. 1C, volatile memory 115 and non-volatile memory 130(1)-(2) is part of a compute node 195. Non-volatile memory 130(3)-(4) and storage devices 160, 165, 170, and 190 are managed by appliance 150. In one embodiment, information containers 150(1) and 150(2) are created as writeable information containers. These information containers persist data that is written by application container 120 from moment to moment (e.g., every second, minute, and the like).

In one embodiment, data that is copied to buffer 125 during the first encoding process (e.g., encoded data 180) is read from buffer 125 and decoded back into its original form (e.g., original data 185), split longitudinally into 4-bit wide sub-streams (e.g., original data 185(1) and 185(2)). Each sub-stream is then written to a different logical container (e.g., logical containers 140(1) and 140(2), respectively), located on a different physical storage device (e.g., non-volatile memory 130(1) and 130(2), respectively).

In some embodiments, data written to non-volatile memory by application container 120 is either encoded or decoded. For example, if original data is written to a logical container implemented on a first layer of logical containers, the original data is encoded before it is transmitted to another logical container implemented on a second layer of logical containers. In this manner, a copy of data (e.g., either original data or encoded data) in each data store (e.g., non-volatile memory 130(1) or 130(3)) can also serve as Error Correcting Code (ECC) for stored copies further up and down the chain (or layers) of logical containers.

Consequently, at each hop (or between each layer of logical containers), the information persistence system transports original data and encodes the original data, or transports the encoded data and decodes the encoded data. Only one type of data (e.g., either original data or encoded data) passes through each stage (or layer) of logical containers. Encoding and decoding data in this manner accomplishes session-level ECC protection independently of the underlying storage and network. In addition, software-controlled dynamic/connection-time definition and allocation of a dual-purpose application cache hierarchy is also facilitated (e.g., cache tier containers 190(1)-(N) as shown in FIG. 1B).

Figure 2:
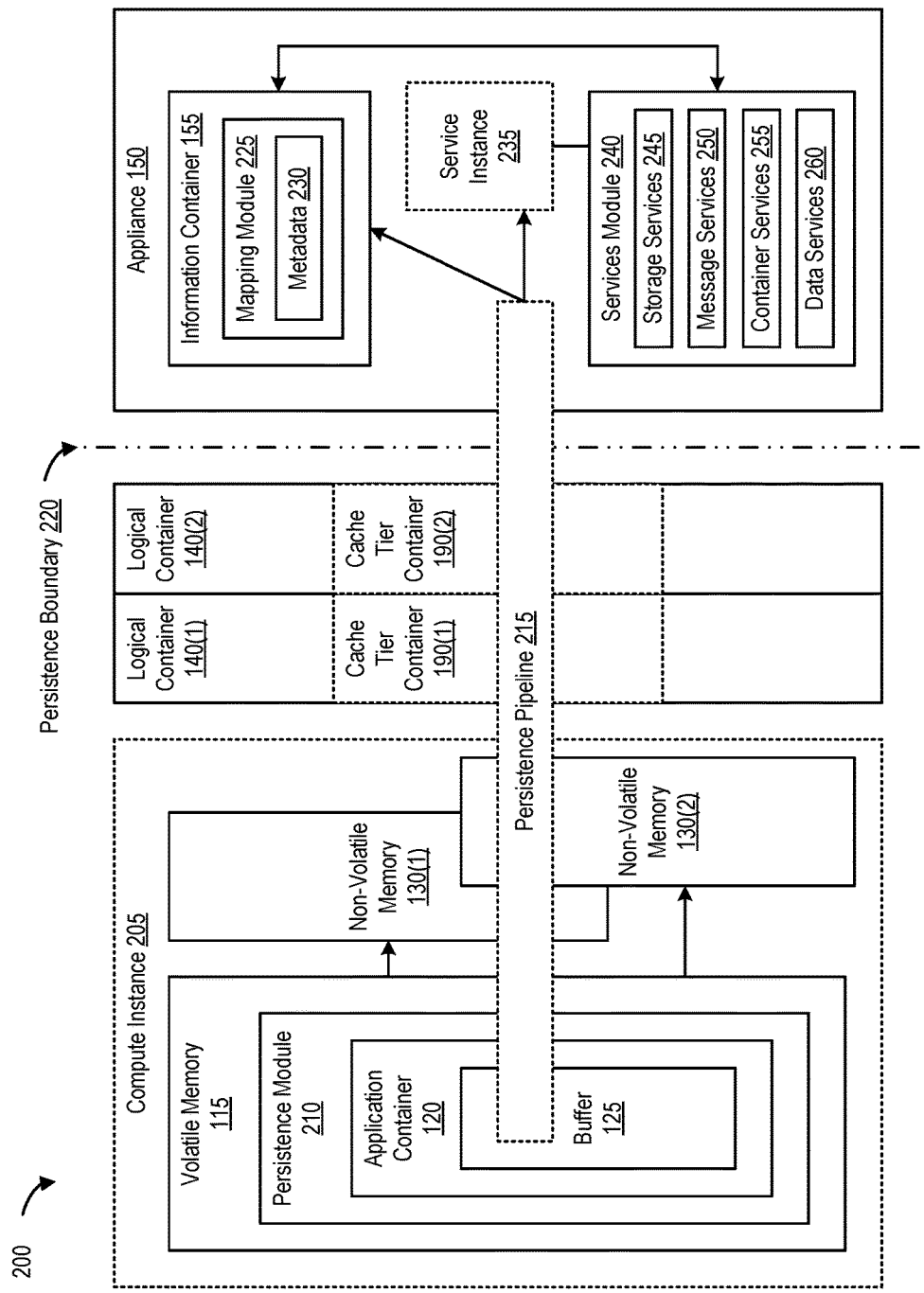
FIG. 2 is a block diagram of a persistence pipeline, according to one embodiment of the present disclosure.

FIG. 2 is a block diagram of a persistence pipeline, according to one embodiment. As shown in FIG. 2, a compute instance 205 implements a persistence module 210. Persistence module 210 executes application container 120.

Also as shown in FIG. 2, appliance 150 includes information container 155. Information container 155 implements a mapping module 225. Mapping module 225 stores metadata 230. At runtime, information container 155 is connected to compute instance 205 through the dynamically-defined set of logical containers (e.g., logical containers 140(1) and 140(2)). In this example, the set of logical containers are designed to provide increasing latency and decreasing cost. For example, compared to logical container 140(1), logical container 140(2) has increased storage latency, but is cheaper than the storage device that is dynamically-defined to correspond to logical container 140(1). Therefore, each logical container is ephemeral and is, at least temporarily, an element of an underlying storage environment/device upon which information container 155 is momentarily persisted.

When data is written by application container 120, the data is transmitted (or transported) in the direction of the cheapest storage and is written through the currently-defined cache/tiering hierarchy (e.g., cache tier containers 190(1) and 190(2)) for information container 155. As noted, logical containers can be created directly by persistence module 210, or logical containers can be created by nodes on which such logical containers execute (e.g., node 135(1)). Also as noted, the logical container is dynamically defined to correspond to a storage device. In one embodiment, original data or encoded data written by an application container is received. If original data is received, encoded data is generated from the original data. If encoded data is received, original data is generated from the encoded data.

As shown in FIG. 2, appliance 150 also executes a service instance 235. Service instance 235 is coupled to services module 240. Because persistence pipeline 215 runs between application container 120 and information container 155, service instance 235 can provide various management-based software services to application container 120 via persistence pipeline 215. For example, service instance 235, in conjunction with information container 155 and persistence pipeline 215 can facilitate storage services 245, message services 250, container services 255, and data services 260, in addition to other software services required by application container 120 and information container 155.

Compute Instance/Node Environment

Figure 3A:
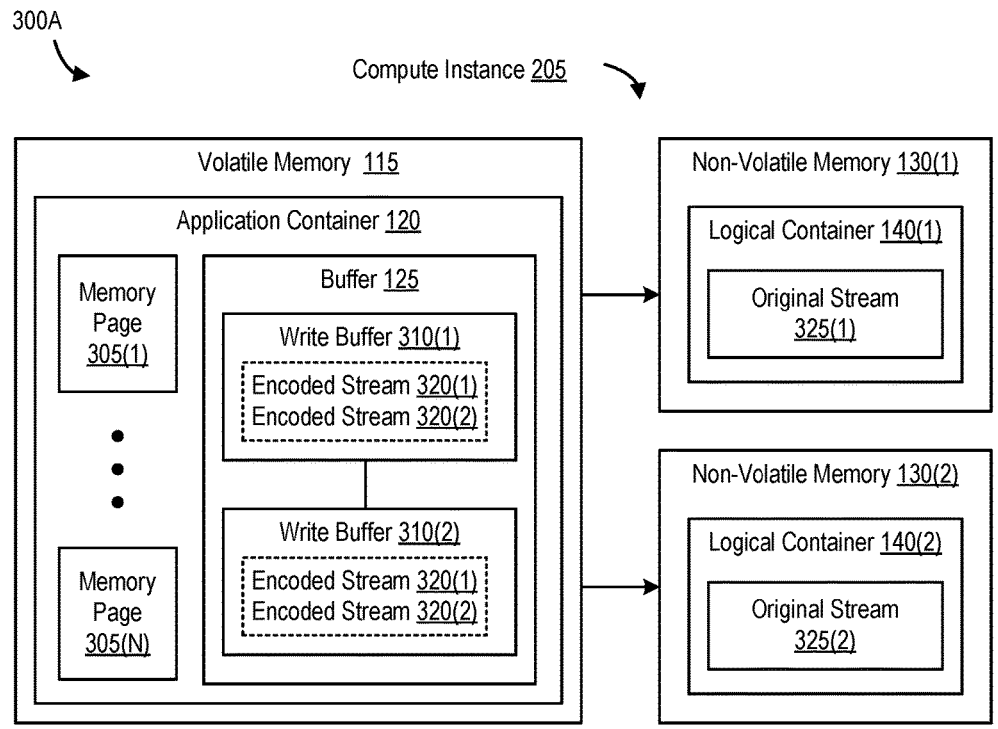
FIG. 3A is a block diagram of an application container and a logical container, according to one embodiment of the present disclosure.

FIG. 3A is a block diagram of an application container and a logical container, according to one embodiment. Compute instance 205 includes application container 120 executing in volatile memory 115. As shown in FIG. 3A, buffer 125 implements two write buffers (e.g., write buffers 310(1) and 310(2)). In one embodiment, write buffer 310(1) is a filling buffer and write buffer 130(2) is a draining buffer. In this example, write buffers 310(1) and 310(2) are Dynamic Random Access Memory (DRAM) buffers or First In First Out (FIFO) buffers, and capture frozen non-volatile memory pages (e.g., memory pages 305(1)-(N)). Write buffer 130(1) is used for filling data, while write buffer 130(2) is used for draining data. These buffers can also be used to stall application container 120 and/or persistence pipeline 215 when they are both full. In some embodiments, multiple such buffers (e.g., greater than two) can be implemented, and these (multiple) buffers can operate as a circular set of buffers.

When data is copied from memory pages 130(1)-(N) into buffer 125, persistence module 210 creates an encoded copy of the data. Therefore, buffer 125 contains a byte-by-byte CRC-8 encoded copy of the original data (e.g., shown as encoded streams 320(1) and 320(2)). After original data is encoded when copied to buffer 125, the original data is read from buffer 125 and decoded back to its original form, split longitudinally into 4-bit wide sub-streams (e.g., each containing 4 bits of each plain text byte), and written to a different logical container that is dynamically-defined to correspond to a different storage device (e.g., original stream 325(1) on logical container 140(1), and original stream 325(2) on logical container 140(2)).

The original stream (e.g., original stream 325(1)) and the encoded stream (e.g., encoded stream 320(1)) each contain a differently encoded but complete representation of the original data (e.g., original data 185). Original stream 325(1) includes a copy of original data 185. The original stream can be held on one buffer/storage device or split longitudinally into two 4-bit wide sub-streams on two non-volatile memory devices (e.g., as original streams 325(1) and 325(2)). Likewise, the encoded stream may be held in one buffer/storage device, or split into two 4-bit sub-streams (e.g., as encoded streams 320(1) and 320(2)).

In one embodiment, only the encoded stream (e.g., encoded streams 320(1) and 320(2)) or the original stream (e.g., original streams 325(1) and 325(2)) along with stream-level ECC (e.g., a 32-bit CRC or secure hash) for both encoded streams 320(1) and 320(2) and original streams 325(1) and 325(2) is transported for each hop (or layer) through persistence pipeline 215. This process alternates from one to the other at each stage (e.g., either the original stream is transported and encoded, or the encoded stream is transported and decoded between each layer/hop/stage of logical containers). In this example, the checksums for both the encoded streams and the original streams are transmitted end-to-end through persistence pipeline 215 (e.g., from application container 120 to information container 155). As noted, the original stream is user data (original data 185), and the encoded stream is the 8-bit CRC for each byte of original data 185 (e.g., split into two 4-bit sub-streams as encoded streams 320(1) and 320(2)).

Appliance/Server-Side Persistence Environment

Figure 3B:
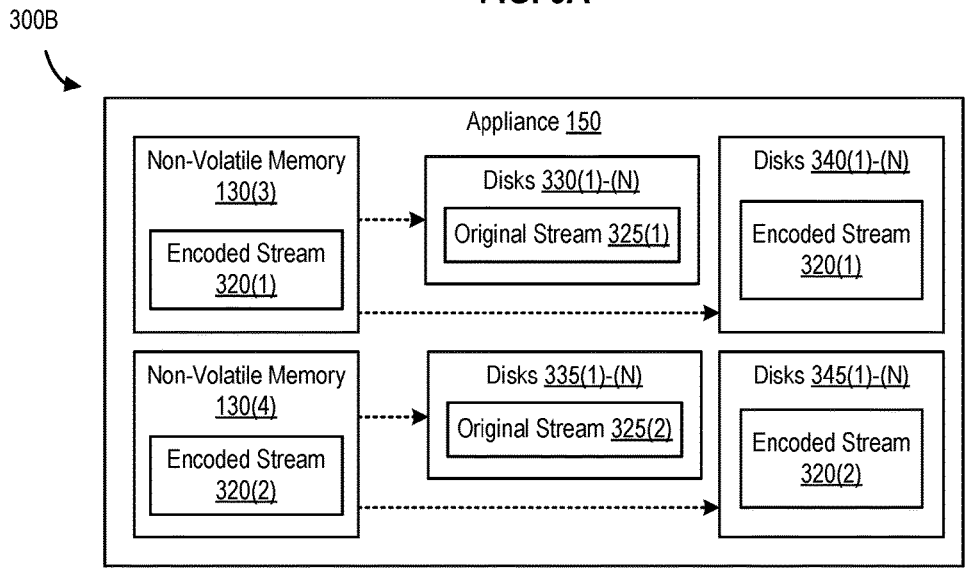
FIG. 3B is a block diagram of an appliance that implements an information container, according to one embodiment of the present disclosure.

FIG. 3B is a block diagram of an appliance that implements an information container, according to one embodiment. Encoded data or original data along with encoded metadata and original metadata is received by appliance 150. Appliance 150 then sends the received data to one or more storage devices that correspond to the logical container(s) through which the data passes through (e.g., via persistence pipeline 215). In this example, the data is received as two complementary 4-bit sub-streams (e.g., encoded streams 320(1) and 320(2)) and is stored across two parallel containers (e.g., non-volatile memory 130(3) and 130(4)) on appliance 150 prior to being sent to disks 330(1)-(N) and 335(1)-(N) as original streams 325(1) and 325(2) and to disks 340(1)-(N) and 345(1)-(N) as encoded streams 320(1) and 320(2)).

Information container 155 implemented in appliance 150 is past persistence boundary 220. Once data has passed persistence boundary 220, appliance 150 and/or information container 155 generates a confirmation that the data is now persistent and identifies information originally supplied by application container 120 so that information container 155 knows which data item is persistent. Information container 155 (e.g., using mapping module 225) also generates an identifier to be used by application container 120 to map the data item into the application namespace (which may be different from the identifier the application container originally sent down the persistent pipeline). Appliance 150 sends this identifier back to application container 120 so that application container 120 can use this identifier to update its namespace.

The identifier originally sent by application container 120 down persistence pipeline 215 is metadata (e.g., metadata 230) that is used by application container 120 to uniquely identify the data stream (e.g., the originally calculated CRC-32 or hash of the original stream). In some embodiments, more robust unique identifiers such as CRC-32 of the encoded stream and/or a cryptographically secure hash of either or both of the original and encoded streams can be calculated and appended to metadata 230 along the way down persistence pipeline 215.

In some embodiments, once application container 120 receives the updated reference/identifier for the transferred (or transported) data, application container 120 then transports, in order, a second data item containing an update to the server/appliance-side persisted state of the application container's namespace. It should be noted that until the server-side (e.g., information container 155) receives this second data item (e.g., application container namespace: reference mapping metadata item), the persistence environment (e.g., appliance 150) possesses the data item, but not the name that the application (e.g., executed by compute instance 205) uses to refer to the data item.

Once this second (metadata) item is received by appliance 150, application container 120 has moved forward in time from the point of view of the persistence environment (e.g., appliance 150 and/or information container 155). Consequently, if compute instance 205 disappears or fails, and has to be re-instantiated, the recovered compute instance will be aware of the updated mapping and will be able to access the data to which the mapping refers to.

Figure 3C:
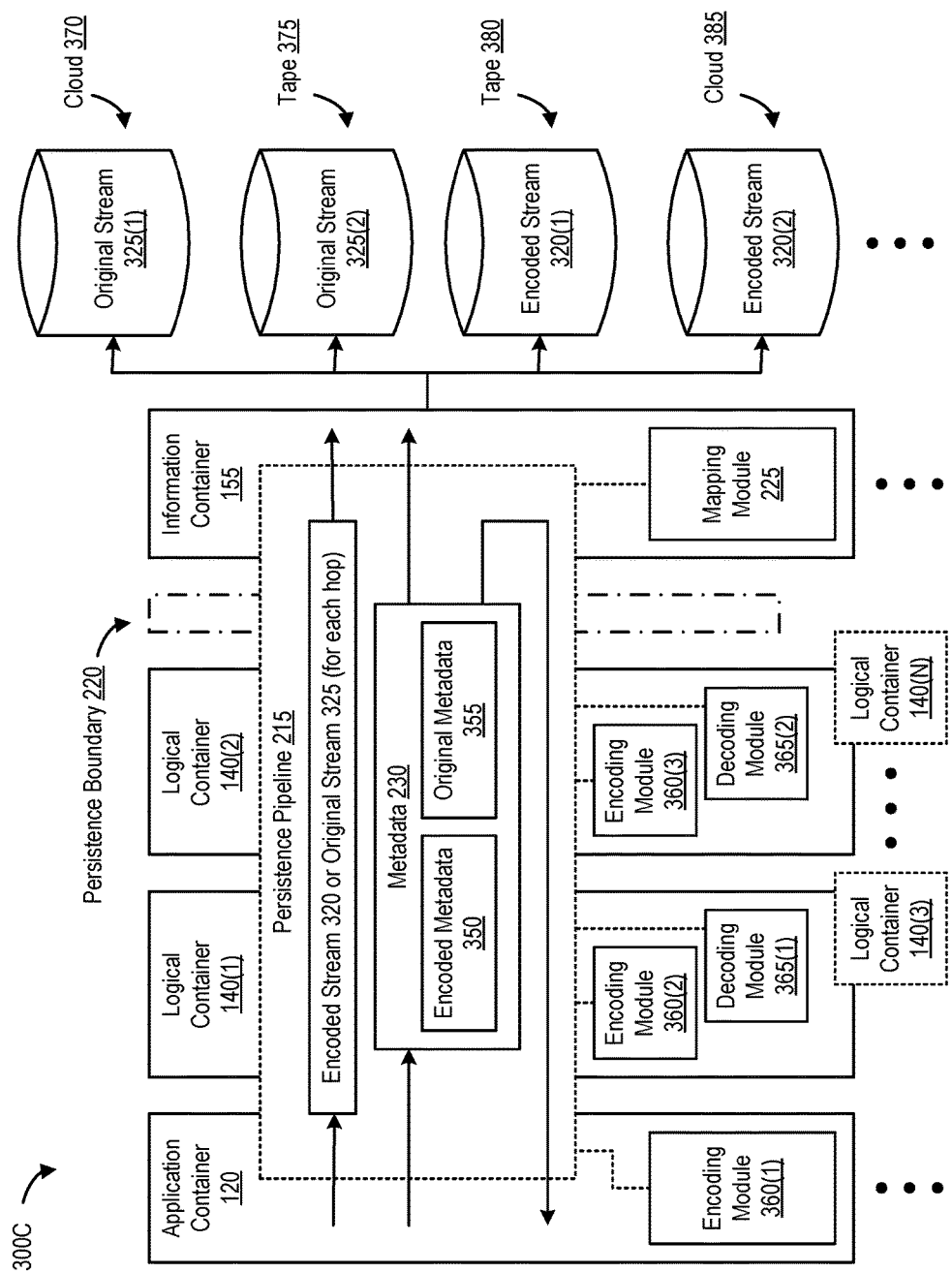
FIG. 3C is a block diagram of a persistence pipeline, according to one embodiment of the present disclosure.

FIG. 3C is a block diagram of a persistence pipeline, according to one embodiment of the present disclosure. In some embodiments, generating encoded data from original data, and original data from encoded data (e.g., by buffer 125 in compute instance 205), also involves calculating original metadata 355 for original data 185 as well as encoded metadata 350 for encoded data 180. The encoding is performed by encoding module 360(1) in application container 120 and by encoding modules 360(2) and 360(3) respectively at various stages/layers/hops of logical containers as shown in FIG. 3C. Likewise, the decoding at each hop or layer (e.g., if the received data is encoded data 180) is performed by decoding modules 365(1) and 365(2) implemented in logical containers 140(1) and 140(2), respectively.

In some embodiments, encoded stream 320 or original stream 325 is transported (or transmitted) along with encoded metadata 350 and original metadata 355 past persistence boundary 220 (e.g., via logical containers 140(1) and 140(2)). Once information container 155 receives the data, information container 155 generates a confirmation that the original data (e.g., original data 185) has been persisted. In this example, the confirmation is generated after original metadata 355 and encoded metadata 350 has been updated by information container 155 (e.g., using mapping module 225) past persistence boundary 220.

The updating (e.g., generating an identifier to be used by application container 120 to map the data item into the application namespace) is performed by information container 155. Also as noted, original stream 325 is generated by compute instance 205 that executes within application container 120, and the logical container (e.g., logical containers 140(1) and 140(2)) are created on ephemeral non-volatile storage devices.

In some embodiments, the encoding and the decoding is performed using a symmetric encoding technique. The symmetric encoding technique permits determination of an ECC from original data 185 or encoded data 180, or identifies original data 185 or encoded data 180 from the ECC. In other embodiments, logical container(s) maintain original data 185 or encoded data 180 in the logical container(s) until application container 120 receives confirmation that original data 185 has been persisted (in addition to receiving the second data item containing the update to the server/appliance-side persisted state of the application container's namespace).

It should be noted that the persistence environment (e.g., appliance 150 and/or information container 155) does not track the application container's namespace information to the data mapping. Application container 120 performs this task. Therefore, from the point of view of the server side (e.g., from the point of view of appliance 150 and/or information container 155), there is no distinction between an application and the client-side application container (e.g., application container 120) which resolves which stored data items map to the names the application uses to reference the persisted data.

Symmetric Encoding Technique

As previously noted, ECC can be used to protect data. In one embodiment, data transported through logical containers is protected using a byte-by-byte symmetric ECC that transforms and stores data-encoded and ECC-encoded representations of a data stream at each stage, hop, and/or layer of persistence pipeline 215. In this manner, the symmetric encoding technique combines error detection and/or correction as well as data propagation into a single operation. For example, object-level checksum (e.g., CRC-32 or secure hash) detects any errors in propagation, and the hop-by-hop symmetric CRC-8 enables error correction (if detected).

A CRC is an error-detecting code that can be used to detect accidental changes to raw data (e.g., original data 185). Blocks of data entering persistent pipeline 215 are attached with a short check value (e.g., checksum and/or hash) based on the remainder of a polynomial division operation on the data stream. On retrieval, the calculation is repeated and, in the event the check values do not match, corrective action can be taken against data corruption. In some embodiments, object-level CRCs are recalculated and checked both on ingest and propagation through each stage, layer, and/or hop so that error-free data is passed down through persistence pipeline 215 in case of storage, network, and/or transport corruption/error. In one embodiment, at the early stages of propagation (e.g., when encoded data 185 or original data 180 is received by a first layer or hop (e.g., logical container 140(1)), each stored data item is tagged with the data item's calculated CRC to serve as a temporary content-addressable cache address for that data item. The data item is retained in each layer and/or hop for at least as long as necessary to guarantee that the data item has been redundantly re-committed further down the chain (e.g., in layers n+1 and n+2, or alternatively, for cheaper storage layers, in parallel across layer n+1).

The simplest CRC is a parity bit. However, parity alone is far from bullet-proof in detecting propagation errors in persistence pipeline 215. However, in some embodiments, enabling detection and correction of multiple errors can be performed using modulo-2 binary long division of the message by an n-bit number. This calculation depends on the number of bits (e.g., the length of the CRC), which bits are set at the start (e.g. the generator polynomial), the remainder at the end of the calculation (referred to as syndrome), and the length of the message.

In some embodiments, one (out of many) symmetric encoding technique is a micro-mirror encoding technique. Under micro-mirroring, the message size and the CRC length are the same (e.g., 8-bits). The polynomial used affords the maximum possible number of different bits between original data 185 and encoded data 180 for each byte (e.g., 5 out of 8 bits will always be different). In addition, the encoding is such that the syndrome calculation can always recover the data even if two contiguous 4-bit regions are entirely missing out of the 16-bit byte (plus the ECC code word). While micro-mirroring affords practical certainty of data integrity even in the presence of some data corruption, micro-mirroring is not fully efficient in terms of network bandwidth and storage utilization. However, this inefficiency can be overcome without compromising the byte-by-byte guarantee of integrity by protecting the data in transit with a CRC-32. The CRC-32 provides data integrity in transit, and the chain of alternately-encoded, less than totally corrupted micro-mirrored copies support the CRC-32 by providing nearly absolute data integrity at rest—without compromising transport efficiency or storage costs.

In some embodiments, an alternative to CRC-32 can be used in the form of a secure hash on the whole stream. Although a secure hash does not provide correction capabilities, a secure hash does ensure that all errors are detected. However, once an error is indeed detected, the error can be rectified by combining the data item with errors with the data item's micro-mirror encoded analog from the previous stage, layer, and/or hop. In combination, the foregoing techniques guarantee that all errors are both detected and corrected. In addition, it should be noted that the CRC-32 and/or hash value is required to uniquely identify the data stream that is sent to the server (e.g., appliance 150) so that once the data stream has been persisted, the server (e.g., appliance 150) can communicate the fact that the data has been persisted back to application container 120. As noted, application container 120 in turn updates (and subsequently persists) its namespace mapping for the data.

It should be noted that micro-mirroring is just one out of several possible byte-level ECC symmetric encoding techniques and/or schemes that can be used to encode data. Any symmetric encoding technique and/or methodology can be used as long as the technique and/or methodology permits determination of the ECC from original data 185 or encoded data 180, or permits identification of original data 185 or encoded data 180 from the ECC.

Universal Name as an Information Address

At a suitable point in the propagation sequence (e.g., after having passed through persistence boundary 220 on a storage server with compute resources dedicated to the purpose of data persistence), each persisted data item is given (or allocated) a universal name (e.g., sha2sum CA). This universal name serves as an "information address" so that later, the persisted data item can be found at the closest location it exists to where the persisted data item is needed. Accessing persisted data items in this manner using an information address is possible only if the requesting application instance (e.g., compute instance 205, or some other data/information management process) is connected to at least one information container in which the requested persisted data item is to be found.

Once the universal content address (e.g., the universal name and/or information address) for the persisted data item is known and the conditions for persistence are met, the universal content address is propagated (or sent) back to the originating application container (e.g., application container 120) so that the application container can update its permanent namespace metadata.

Processes to Persist Data as Information

Figure 4:
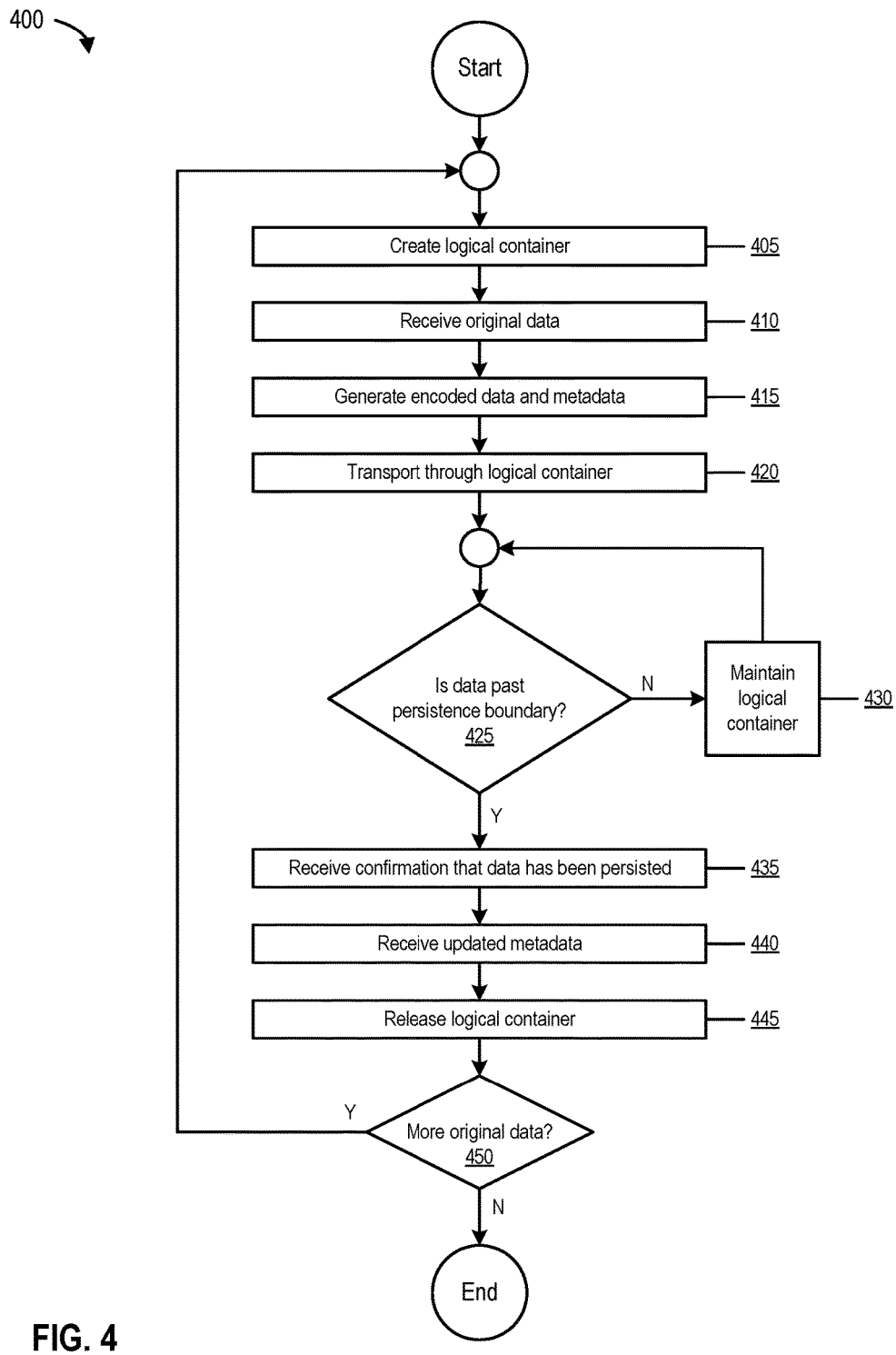
FIG. 4 is a flowchart that illustrates a process for persisting data as information, according to one embodiment of the present disclosure.

FIG. 4 is a flowchart that illustrates a process for persisting data as information, according to one embodiment. The process begins at 405 by creating a logical container (e.g., logical container 140(1) on node 135(1)). As noted, the logical container can be created by computing device 105 if computing device 105 has access to non-volatile memory (e.g., non-volatile memory 130(1) as shown in FIG. 1A). Logical containers can also be created on one or more external nodes based on a request by application container 120 to these one or more nodes to create logical containers (e.g., to nodes 135(1) or 135(2)).

At 410, the process receives original data (e.g., original data 185). Original data is data that is written by application container 120. In some embodiments, the original data is user data and is initially captured by (frozen) memory pages (e.g., memory page 305(1) as shown in FIG. 3A). At 415, the process generates encoded data and metadata (both encoded metadata and original metadata), for example, during the process of copying the original data from one or more memory pages to buffer 125.

At 420, the process transports encoded data as well as encoded metadata and original metadata through one or more logical containers. At 425, the process determines whether the data is past a persistence boundary (e.g., persistence boundary 220). If the data is not yet past the persistence boundary, the process, at 430, maintains (or retains) the logical container (as well as data in the logical container). However, if the data is past the persistence boundary, the process, at 435, receives confirmation (e.g., at application container 120) that the data has been persisted. At 440, the process also receives updated metadata, and at 445, releases (or de-allocates) the logical container. The process ends at 450 by determining if there is more original data to be processed from one or more memory pages.

Figure 5A:
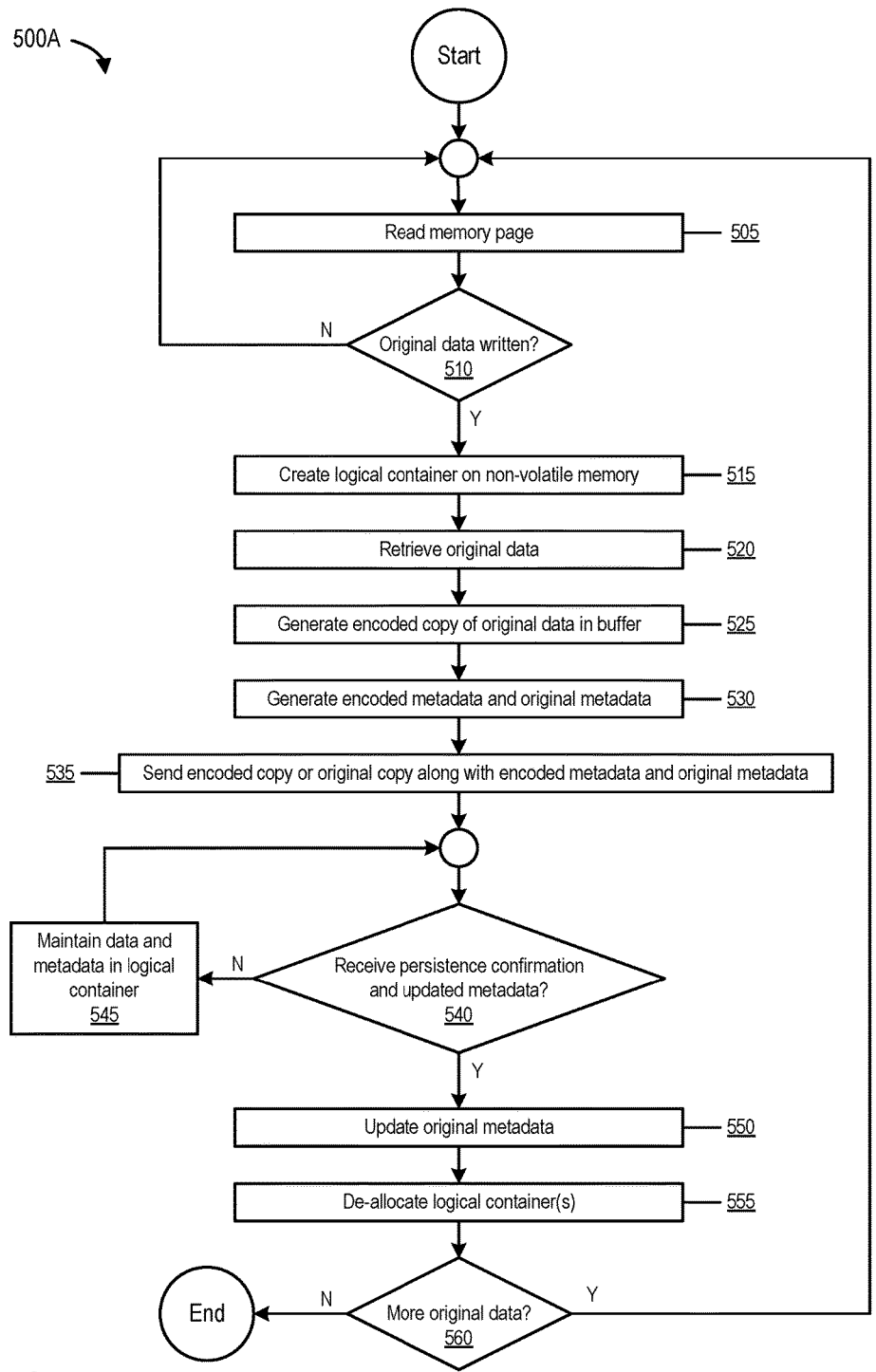
FIG. 5A is a flowchart that illustrates a process for transporting data through logical containers, according to one embodiment of the present disclosure.

FIG. 5A is a flowchart that illustrates a process for transporting, sending, transmitting, and/or propagating data through logical containers, according to one embodiment. The process begins at 505 by reading a memory page (e.g., memory page 305(1)). At 510, the process determines if original data has been written. If original data has been written, the process, at 515, creates one (or more) logical containers on non-volatile memory. At 520, the process retrieves the original data (e.g., by copying the original data from memory page 305(1) to buffer 125).

At 525, the process generates a (CRC-32) encoded copy of the original data in buffer 125. At 530, the process generates encoded metadata and original metadata, and at 535, sends the encoded copy or the original copy along with the encoded metadata and the original metadata (e.g., to one or more logical containers and/or regions within directly-attached ephemeral non-volatile memory devices). At 540, the process determines whether a persistence confirmation along with updated metadata has been received (e.g., at the client-side, for example, at application container 120 and/or computing device 105 from the server-side, for example, from appliance 150 and/or information container 155).

If the persistence confirmation and the updated metadata have not been received, the process, at 545, maintains and retains the data (e.g., either the original data or the encoded data) and the metadata (e.g., the encoded metadata and the original metadata) in the logical container(s). However, if the persistence information and the updated metadata have been received, the process, at 550, updates the original metadata, and at 555, de-allocates the logical container(s). The process ends at 560 by determining if there is more original data to be processed (e.g., in one or more memory pages).

Figure 5B:
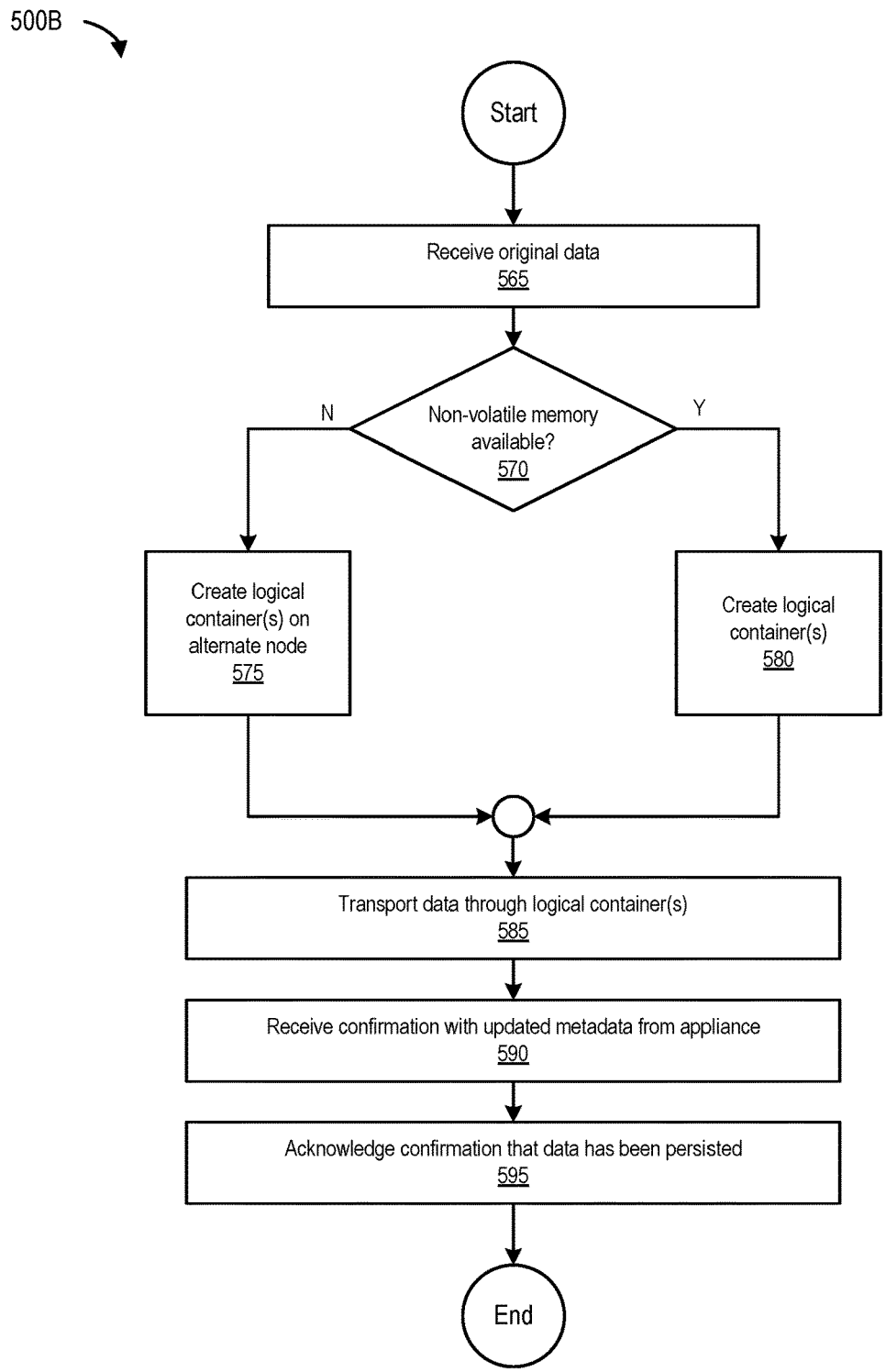
FIG. 5B is a flowchart that illustrates a process for receiving confirmation that data has been persisted, according to one embodiment of the present disclosure.

FIG. 5B is a flowchart that illustrates a process for receiving confirmation that data has been persisted, according to one embodiment. The process begins at 565 by receiving (or retrieving) original data. At 570, the process determines if non-volatile memory is available. If non-volatile memory is not available, the process, at 575, creates one or more logical container(s) on an alternate node. However, if non-volatile memory is available (e.g., to computing device 105), the process, at 580, creates logical container(s) on the non-volatile memory. At 585, the process transports the data through the logical container(s) (e.g., by encoding or decoding the data at each stage, layer, and/or hop of logical container(s)).

At 590, the process receives confirmation (e.g., at application container 120 from the server-side from appliance 150 and/or information container 155) with updated metadata (as well as a notification that the data has been persisted). The process ends at 595 by acknowledging the confirmation/notification that the data has been persisted.

Figure 6A:
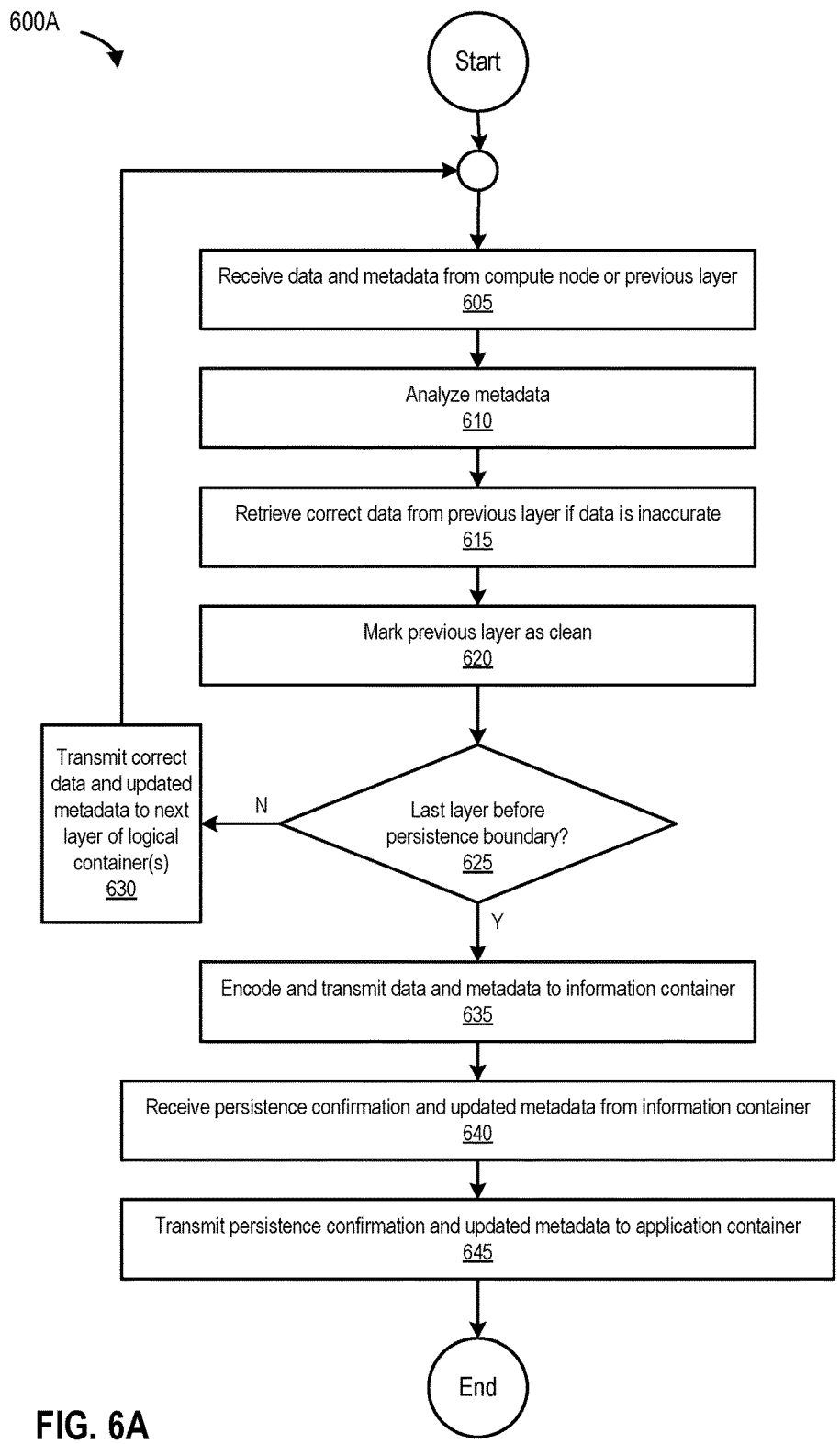
FIG. 6A is a flowchart that illustrates a process for data hopping through logical containers, according to one embodiment of the present disclosure.

FIG. 6A is a flowchart that illustrates a process for data hopping through one or more layers of logical containers, according to one embodiment. The process begins at 605 by receiving either encoded data or original data along with encoded metadata and original metadata from a compute node (e.g., computing device 105, compute node 195, and the like) or from a previous layer of logical container(s). At 610, the process analyzes the metadata (e.g., compares the encoded metadata and the original metadata). At 615, the process retrieves the correct data from the previous layer (or from the compute node if the compute node is the previous layer) (e.g., if there is a mismatch between the encoded metadata and the original metadata). At 620, the process marks the previous layer (or the data in the previous layer of logical container(s)) as clean (e.g., evictable).

It should be noted that each layer of logical container(s) also serves as a cache. Therefore, once error-free or "good" data has been successfully propagated through a given set of logical containers, the previous copy of the data is marked as clean so that the previous copy can be evicted. In some embodiments, for complete resilience, data in a given layer of logical container(s) is not marked as clean (for eviction) until the error-free data item has been stored in at least two subsequent layers, or has been passed through the persistence boundary.

At 625, the process determines if the layer is the last layer before the persistence boundary. If the layer is not the last layer before the persistence boundary, the process, at 630, transmits error-free, correct, and/or good data and updated metadata to the next layer or hop of logical container(s). However, if the layer is the last layer before the persistence boundary, the process, at 635, encodes and transmits the data (e.g., encoded data) as well as metadata (e.g., encoded metadata and original metadata) to the information container (e.g., information container 155). At 640, the process receives persistence confirmation and updated metadata from the information container. The process ends at 645 by transmitting or back-propagating the persistence confirmation along with the updated metadata to the application container.

Figure 6B:
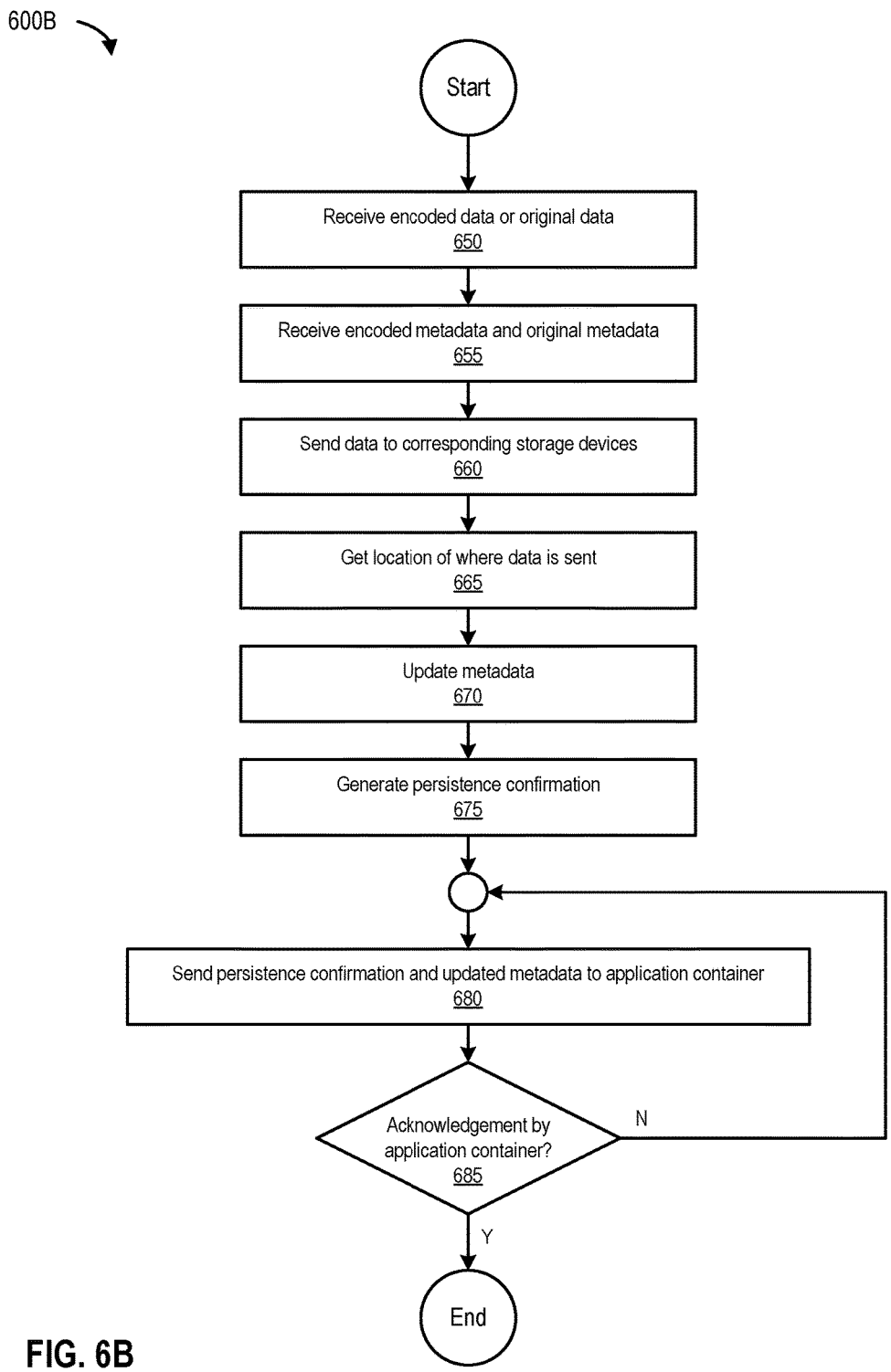
FIG. 6B is a flowchart that illustrates a process for sending a persistence confirmation to an application container, according to one embodiment of the present disclosure.

FIG. 6B is a flowchart that illustrates a process for sending a persistence confirmation to an application container, according to one embodiment. The process begins at 650 by receiving encoded data or original data (e.g., from compute instance 205). At 655, the process also receives encoded metadata and original metadata. At 660, the process sends the data to corresponding storage devices (e.g., storage devices that correspond to the dynamically-defined logical container(s) in the compute instance). At 665, the process gets the location of where the data is sent (e.g., each persisted data item is given (or allocated) a universal name (e.g., sha2sum CA) that serves as an "information address" so that the persisted data item can be found at the closest location it exists to where the persisted data item is needed).

At 670, the process updates metadata (e.g., information containing an update to the server/appliance-side persisted state of the application container's namespace). At 675, the process generates a persistence confirmation. At 680, the process sends (or back-propagates) the persistence confirmation and the updated metadata to the application container. The process ends at 685 by determining whether there is an acknowledgment by the application container.

It should be noted that the application container's metadata is updated with an abstract reference (e.g., a universal name, an information address, and/or a universal content address that uniquely identifies the persistent data item, regardless of the persistent data item's storage location). In this manner, the metadata remains valid and can be used to identify and locate the persisted data item even if the actual storage (location) of the persisted data item changes (or is moved) for any reason.

FIG. 7A is a flowchart that illustrates a process for transporting, transmitting, sending, and/or propagating data through logical containers, according to one embodiment. The process begins at 705 by receiving data (e.g., original data or encoded data) and metadata (e.g., original metadata and encoded metadata) from an application container. At 710, the process determines whether the next layer (of logical container(s)) is faulted (e.g., whether the node that implements the logical container(s) or the logical container(s) themselves have failed for any reason). At 715, the process determines whether there are more (or additional) layer(s) of logical container(s) before the persistence boundary.

If there are more (or additional) layer(s) of logical container(s) before the persistence boundary, the process, at 720, propagates (or transmits) data to available layer(s) of logical container(s) (e.g., to the next available and functional layer, stage, and/or hop). However, if there are no additional layer(s) of logical container(s) before the persistence boundary, the process ends at 725 by propagating (or transmitting) data (and metadata) past the persistence boundary to the appliance (e.g., to the server-side persistence environment).

It should be noted that to fully protect the data against a faulted layer, at least one copy of both the original data and the encoded is required (e.g., in at least two previous layers). Because a given layer of logical container(s) only has either encoded data or original data, in some embodiments, at least two layers of logical container(s) can be maintained where a first layer has the encoded data and the second layer has the original data. In one embodiment, recovery from the loss of a logical container involves inserting an empty replacement logical container into the persistence pipeline and either resending all the "dirty" data items from the layer above the faulted layer, or resending only certain data items that are responsive to requests for recovery data. Therefore, each data item is marked as "dirty" until after hop n+2.

FIG. 7B is a flowchart that illustrates a process for receiving a persistence confirmation acknowledgement from a compute node, according to one embodiment. The process begins at 730 by receiving data (e.g., either encoded data or original data) along with metadata (e.g., both original metadata and encoded metadata) from one or more layers of logical container(s). At 735, the process updates the received metadata with the location of the data (e.g., a universal name, an information address, and/or a universal content address that uniquely identifies the persistent data item, regardless of the persistent data item's actual storage location).

At 740, the process generates a persistence confirmation, and at 745, sends (or back-propagates) the persistence confirmation directly to the compute node (e.g., to the client-side, compute node 195, computing device 105, and/or application container 120). The process ends at 750 by receiving acknowledgement from the compute node (e.g., from the client-side and/or from the application container).

An Example Computing Environment

Figure 8:
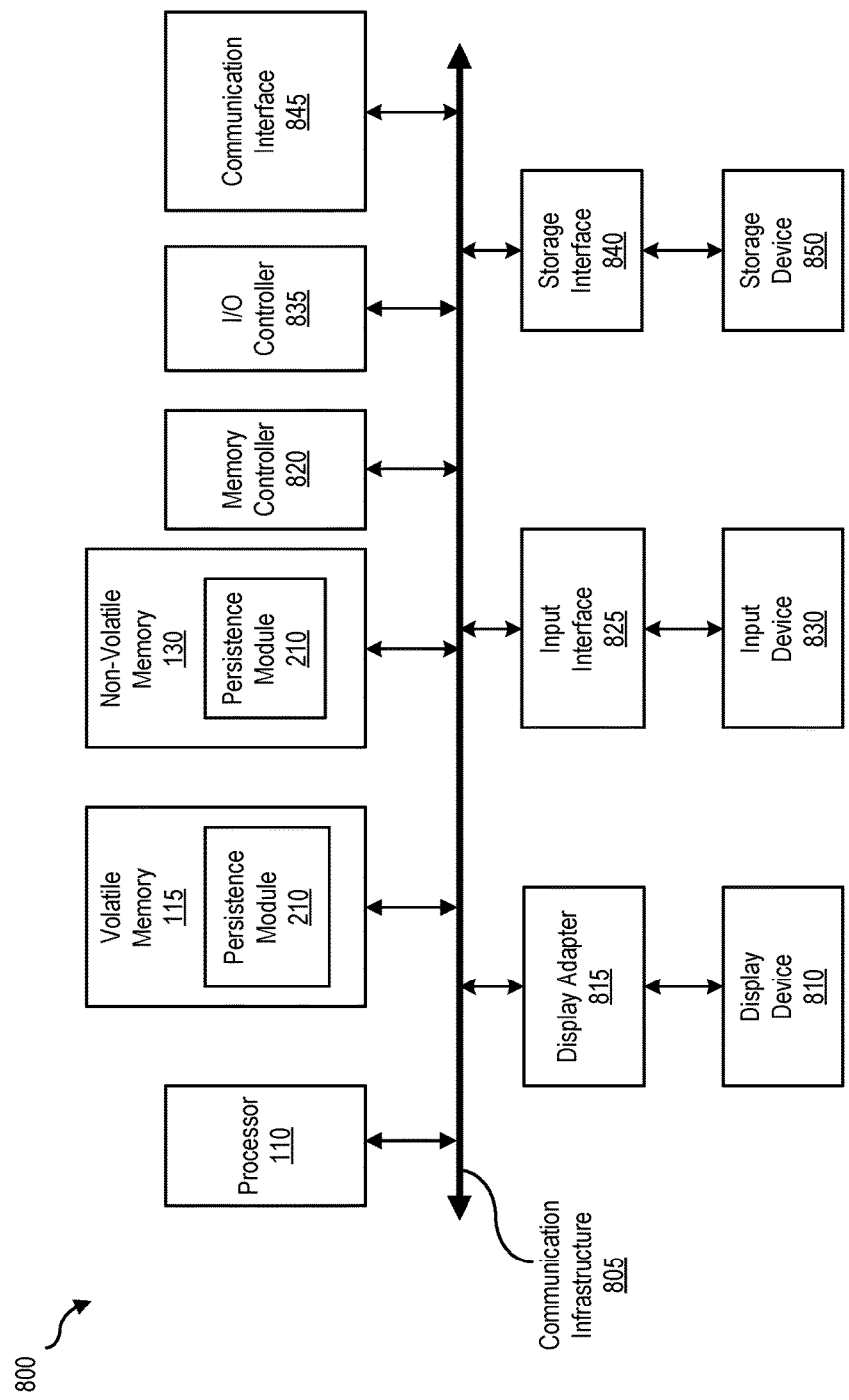
FIG. 8 is a block diagram of a computing system, illustrating how a persistence module can be implemented in software, according to one embodiment of the present disclosure.

FIG. 8 is a block diagram of a computing system, illustrating how a persistence module can be implemented in software, according to one embodiment. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 110 and a volatile memory 115. By executing the software that implements the IPP, computing system 800 becomes a special purpose computing device that is configured to persist data as information in container-based application environments.

Processor 110 generally represents any type or form of processing unit capable of processing data or interpreting and executing instructions. In certain embodiments, processor 110 may receive instructions from a software application or module. These instructions may cause processor 110 to perform the functions of one or more of the embodiments described and/or illustrated herein. For example, processor 110 may perform and/or be a means for performing all or some of the operations described herein. Processor 110 may also perform and/or be a means for performing any other operations, methods, or processes described and/or illustrated herein.

Volatile memory 115 and non-volatile memory 130 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a persistence module and/or an information persistence platform may be loaded into volatile memory 115 and/or non-volatile memory 130.

In certain embodiments, computing system 800 may also include one or more components or elements in addition to processor 110, volatile memory 115 and/or non-volatile memory 130. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device.

Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 110, volatile memory 115, non-volatile memory 130, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a virtualization server and/or a computing device. For example, in certain embodiments I/O controller 835 may control or facilitate transfer of data between one or more elements of computing system 800, such as processor 110, volatile memory 115, non-volatile memory 130, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in volatile memory 115, non-volatile memory 130 and/or various portions of storage device 850. When executed by processor 110, a computer program loaded into computing system 800 may cause processor 110 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

An Example Networking Environment

Figure 9:
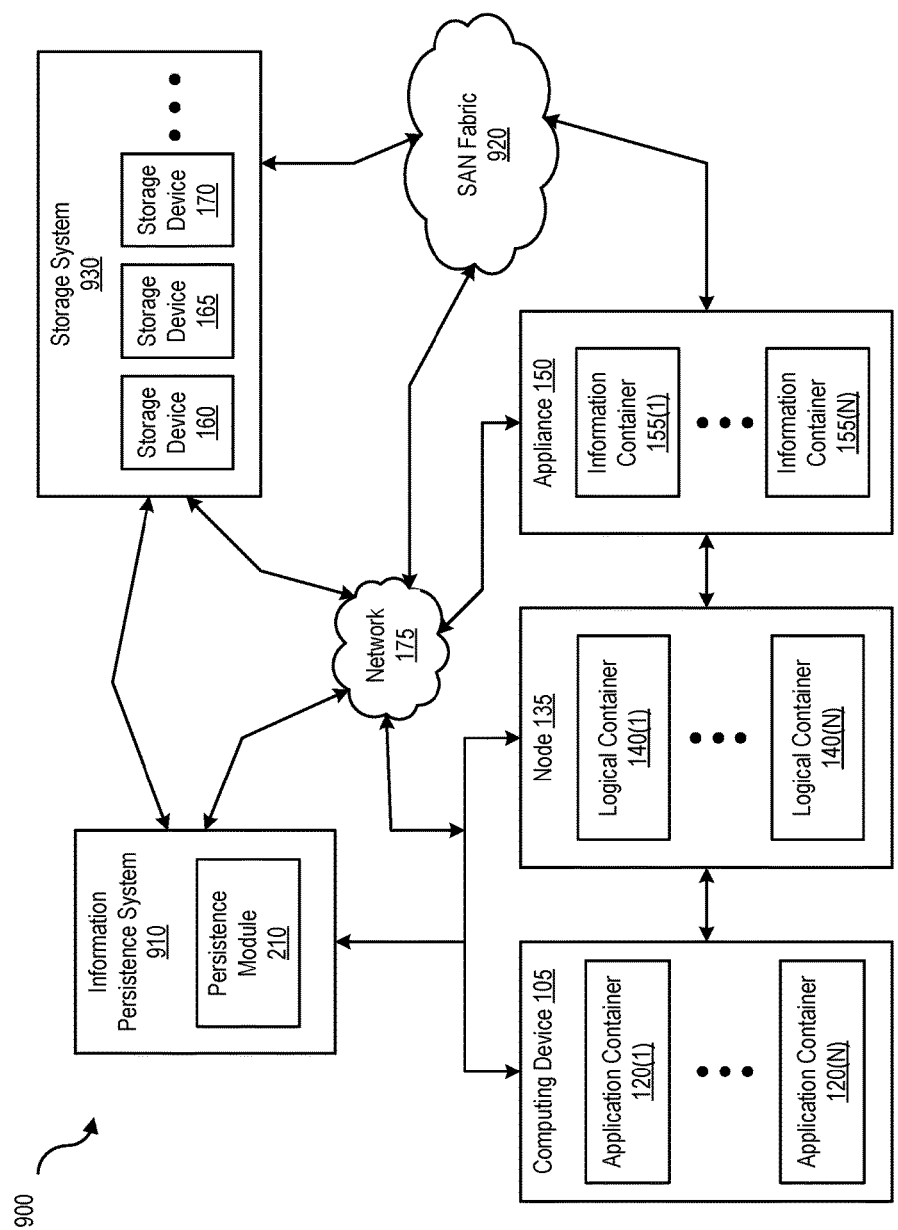
FIG. 9 is a block diagram of a networked system, illustrating how various devices can communicate via a network, according to one embodiment of the present disclosure.

FIG. 9 is a block diagram of a networked system, illustrating how various devices can communicate via a network, according to one embodiment of the present disclosure. In certain embodiments, network-attached storage (NAS) devices may be configured to communicate with the IPP using various protocols, such as Network File System (NFS), Server Message Block (SMB), or Common Internet File System (CIFS). Network 175 generally represents any type or form of computer network or architecture capable of facilitating communication between multiple computing devices. Network 175 may facilitate communication between the IPP, information persistence system 910, computing devices 105(1)-(N), nodes 135(1)-(N), and/or appliances 150(1)-(N). In certain embodiments, a communication interface, such as communication interface 845 in FIG. 8, may be used to provide connectivity between the IPP and network 175. It should be noted that the embodiments described and/or illustrated herein are not limited to the Internet or any particular network-based environment. For example, network 175 can be a Storage Area Network (SAN).

In one embodiment, all or a portion of one or more of the disclosed embodiments may be encoded as a computer program and loaded onto and executed by the IPP, information persistence system 910, computing devices 105(1)-(N), nodes 135(1)-(N), or appliances 150(1)-(N), or any combination thereof. All or a portion of one or more of the embodiments disclosed herein may also be encoded as a computer program, stored on computing devices 105(1)-(N), nodes 135(1)-(N), and/or appliances 150(1)-(N), and distributed over network 175. In some examples, all or a portion of the IPP may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, computing devices 105(1)-(N), nodes 135(1)-(N), and/or appliances 150(1)-(N) may transform the behavior of information persistence system 910 and/or the IPP in order to cause the information persistence system 910 and/or the IPP to persist data as information, particularly in container-based application environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   receiving, at a the first logical container, original data written by an application container, wherein the first logical container does not provide persistent storage, and the application container is communicatively coupled to a non-volatile memory;

subsequent to receiving the original data, generating encoded data from the original data;

transporting the encoded data to a second logical container, wherein the second logical container does not provide persistent storage, and the second logical container has a higher latency than the first logical container;

receiving, at the second logical container, the encoded data;

subsequent to receiving the encoded data, generating the original data from the encoded data;

subsequent to generating the original data from the encoded data, transporting the original data toward a storage device, wherein the storage device is one of a plurality of storage devices associated with a network, and the storage device provides persistence storage;

receiving, at the storage device, at least one of the original data and the encoded data (collectively, "the data");

subsequent to receiving the data at the storage device, storing the data in the storage device, and sending an identifier to the application container, wherein the identifier comprises information identifying the storage device among the plurality of storage devices in which the data is stored;

receiving the identifier at the application container;

subsequent to receiving the identifier at the application container, storing the identifier in the non-volatile memory communicatively coupled to the application container;

subsequent to the storing the data at the storage device, receiving a request to access the data stored in the storage device, wherein the request is received at the application container; and using the identifier to access the data stored in the storage device.

2. The method of claim 1, wherein generating the encoded data and generating the original data also comprises calculating an original metadata for the original data, and calculating an encoded metadata for the encoded data.

3. The method of claim 2, further comprising:

transporting the encoded data or the original data along with the original metadata and the encoded metadata through a subsequent logical container past a persistence boundary.

4. The method of claim 3, wherein the identifier is generated after the original metadata and the encoded metadata have been updated past the persistence boundary, updating the original metadata and the encoded metadata past the persistence boundary is performed by an information container, and the identifier is generated by the information container.

5. The method of claim 1, wherein the original data is generated by an application instance, the application instance executes within the application container, and at least one of the first logical container and the second logical container is created on a non-volatile storage device.

6. The method of claim 5, further comprising:

causing the original data to be copied to a transport buffer, wherein the transport buffer is associated with the application instance, and the original data is part of an original stream; and generating an encoded stream by encoding the original data, wherein the encoded stream comprises the encoded data, and the generating the encoded stream further comprises calculating original metadata and encoded metadata.

7. The method of claim 6, further comprising:

accessing the encoded stream in the transport buffer;

decoding the encoded stream, wherein the decoding comprises splitting the encoded stream into at least two original sub-streams;

writing a first original sub-stream to a third logical container; and writing a second original sub-stream to a fourth logical container.

8. The method of claim 6, wherein transporting the encoded data or the original data comprises transporting the encoded stream and decoding the encoded stream, or transporting the original stream and encoding the original stream.

9. The method of claim 7, wherein the encoding and the decoding are performed using a symmetric encoding technique.

10. The method of claim 9, wherein the symmetric encoding technique permits determination of an error-correcting code (ECC) from the original data or the encoded data, or identifies the original data or the encoded data from the ECC.

11. The method of claim 2, further comprising maintaining the original data or the encoded data in the first logical container until the application container receives the identifier.

12. A non-transitory computer readable storage medium comprising program instructions executable to:

receive, at a first logical container, original data written by an application container, wherein the first logical container does not provide persistent storage, and the application container is communicatively coupled to a non-volatile memory;

subsequent to receiving the original data, generate encoded data from the original data;

transport the encoded data to a second logical container, wherein the second logical container does not provide persistent storage, and the second logical container has a higher latency than the first logical container;

receive, at the second logical container, the encoded data;

subsequent to receiving the encoded data, generate the original data from the encoded data;

subsequent to generating the original data from the encoded data, transport the original data toward a storage device, wherein the storage device is one of a plurality of storage devices associated with a network, and the storage device provides persistence storage;

receive, at the storage device, at least one of the original data and the encoded data (collectively, "the data");

subsequent to receiving the data at the storage device,
store the data in the storage device, and
send an identifier to the application container, wherein
the identifier comprises information identifying the storage device among the plurality of storage devices in which the data is stored;

receive the identifier at the application container;

subsequent to receiving the identifier at the application container, store the identifier in the non-volatile memory communicatively coupled to the application container;

subsequent to storing the data at the storage device, receive a request to access the data stored in the storage device, wherein
the request is received at the application container; and use the identifier to access the data stored in the storage device.

13. The non-transitory computer readable storage medium of claim 12, wherein the program instructions are further executable to:

generate the encoded data and generating the original data by
calculating an original metadata for the original data, and
calculating an encoded metadata for the encoded data;

transport the encoded data or the original data along with the original metadata and the encoded metadata through a subsequent logical container past a persistence boundary.

14. The non-transitory computer readable storage medium of claim 13, wherein the identifier is generated after the original metadata and the encoded metadata have been updated past the persistence boundary, updating the original metadata and the encoded metadata past the persistence boundary is performed by an information container, the identifier is generated by the information container, the original data is generated by an application instance, the application instance executes within the application container, and at least one of the first logical container and the second logical container is created on a non-volatile storage device.

15. The non-transitory computer readable storage medium of claim 14, wherein the program instructions are further executable to:

cause the original data to be copied to a transport buffer, wherein
the transport buffer is associated with the application instance, and
the original data is part of an original stream; and generate an encoded stream by encoding the original data, wherein
the encoded stream comprises the encoded data, and
the generating the encoded stream further comprises calculating the original metadata and the encoded metadata;

access the encoded stream in the transport buffer;

decode the encoded stream, wherein
decoding the encoded stream comprises splitting the encoded stream into at least two original sub-streams;

write a first original sub-stream to a third logical container;

write a second original sub-stream to a fourth logical container; and maintain the original data or the encoded data in either the first logical container or the second logical container until the application container receives the identifier.

16. The non-transitory computer readable storage medium of claim 15, wherein transporting the encoded data or the original data comprises
transporting the encoded stream and decoding the encoded stream, or
transporting the original stream and encoding the original stream, the encoding and the decoding are performed using a symmetric encoding technique, and the symmetric encoding technique permits
determination of an error-correcting code (ECC) from the original data or the encoded data, or
identifies the original data or the encoded data from the ECC.

17. A system comprising:

one or more processors; and a memory coupled to the one or more processors, wherein the memory stores program instructions executable by the one or more processors to:

receive, at a first logical container, original data written by an application container, wherein
the first logical container does not provide persistent storage, and
the application container is communicatively coupled to a non-volatile memory;

subsequent to receiving the original data, generate encoded data from the original data;

transport the encoded data to a second logical container, wherein
the second logical container does not provide persistent storage, and
the second logical container has a higher latency than the first logical container;

receive, at the second logical container, the encoded data;

subsequent to receiving the encoded data, generate the original data from the encoded data;

subsequent to generating the original data from the encoded data, transport the original data toward a storage device, wherein
the storage device is one of a plurality of storage devices associated with a network, and
the storage device provides persistence storage;

receive, at the storage device, at least one of the original data and the encoded data (collectively, "the data");

subsequent to receiving the data at the storage device,
store the data in the storage device, and
send an identifier to the application container, wherein
the identifier comprises information identifying the storage device among the plurality of storage devices in which the data is stored;

receive the identifier at the application container;

subsequent to receiving the identifier at the application container, store the identifier in the non-volatile memory communicatively coupled to the application container;

subsequent to storing the data at the storage device, receive a request to access the data stored in the storage device, wherein the request is received at the application container; and use the identifier to access the data stored in the storage device.

18. The system of claim 17, wherein the program instructions are further executable to:

generate the encoded data and generating the original data by calculating an original metadata for the original data, and calculating an encoded metadata for the encoded data;

transport the encoded data or the original data along with the original metadata and the encoded metadata through a subsequent logical container past a persistence boundary.

19. The system of claim 18, wherein the identifier is generated after the original metadata and the encoded metadata have been updated past the persistence boundary, updating the original metadata and the encoded metadata past the persistence boundary is performed by an information container, the identifier is generated by the information container, the original data is generated by an application instance, the application instance executes within the application container, and at least one of the first logical container and the second logical container is created on a non-volatile storage device.

20. The system of claim 19, wherein the program instructions are further executable to:

cause the original data to be copied to a transport buffer, wherein the transport buffer is associated with the application instance, and the original data is part of an original stream; and generate an encoded stream by encoding the original data, wherein the encoded stream comprises the encoded data, and creating the encoded stream further comprises calculating the original metadata and the encoded metadata;

access the encoded stream in the transport buffer;

decode the encoded stream, wherein decoding the encoded stream comprises splitting the encoded stream into at least two original sub-streams;

write a first original sub-stream to a third logical container;

write a second original sub-stream to a fourth logical container; and maintain the original data or the encoded data in either the first logical container or the second logical container until the application container receives the identifier.

21. The system of claim 20, wherein transporting the encoded data or the original data comprises transporting the encoded stream and decoding the encoded stream, or transporting the original stream and encoding the original stream, the encoding and the decoding are performed using a symmetric encoding technique, and the symmetric encoding technique permits determination of an error-correcting code (ECC) from the original data or the encoded data, or identifies the original data or the encoded data from the ECC.

22. The method of claim 1, wherein:

subsequent to transporting the original data toward the storage device, receiving the original data at a third logical container, wherein the third logical container has a higher latency than the first logical container;

subsequent to receiving the original data at the third logical container, generating the encoded data from the original data; and subsequent to generating the encoded data from the original data, transporting the encoded data toward the storage device.

* * * * *